(12) United States Patent
Iwamoto et al.

(10) Patent No.: US 6,502,757 B1
(45) Date of Patent: Jan. 7, 2003

(54) INFORMATION RECORDED MEDIUM, DEVICE FOR READING THE INFORMATION, INFORMATION RECORDED MEDIUM TRANSFER FOIL, AND METHOD FOR PRODUCING INFORMATION RECORDED MEDIUM

(75) Inventors: Yoji Iwamoto, Tokyo-To (JP); Osamu Nakamura, Tokyo-To (JP); Daisaku Haoto, Tokyo-To (JP); Kenjiro Kaku, Tokyo-To (JP)

(73) Assignee: Dai Nippon Printing Co., Ltd. (JP)

( * ) Notice: Subject to any disclaimer, the term of this patent is extended or adjusted under 35 U.S.C. 154(b) by 0 days.

(21) Appl. No.: 09/856,095
(22) PCT Filed: Sep. 17, 1999
(86) PCT No.: PCT/JP99/05083
§ 371 (c)(1), (2), (4) Date: Jun. 8, 2001
(87) PCT Pub. No.: WO01/22361
PCT Pub. Date: Mar. 29, 2001
(51) Int. Cl.$^7$ .............................................. G06K 19/06
(52) U.S. Cl. ...................................... 235/494; 235/457
(58) Field of Search ................................. 235/457, 493, 235/494

(56) References Cited

U.S. PATENT DOCUMENTS 5,811,775 A * 9/1998 Lee ............................ 235/494

FOREIGN PATENT DOCUMENTS

| JP | 10-105031 | 4/1998 |
| JP | 10-226996 | 8/1998 |
| JP | 11-272836 | 10/1999 |

* cited by examiner

Primary Examiner—Harold I. Pitts
(74) Attorney, Agent, or Firm—Parkhurst & Wendel, L.L.P.

(57) ABSTRACT

An information recording medium (10) comprises a base sheet (2a), a resin layer (2) formed on the base sheet (2a) and having a holographic region (6) provided with a diffraction grating (4) in a regular or irregular arrangement, and a ferromagnetic thin film (3) formed on the holographic region (6) of the resin layer (2). The ferromagnetic thin film (3) has a specific magnetic characteristic dependent on a holographic pattern formed in the holographic region (6). The magnetic characteristics of the ferromagnetic thin film are converted into signals corresponding to the holographic pattern.

28 Claims, 16 Drawing Sheets

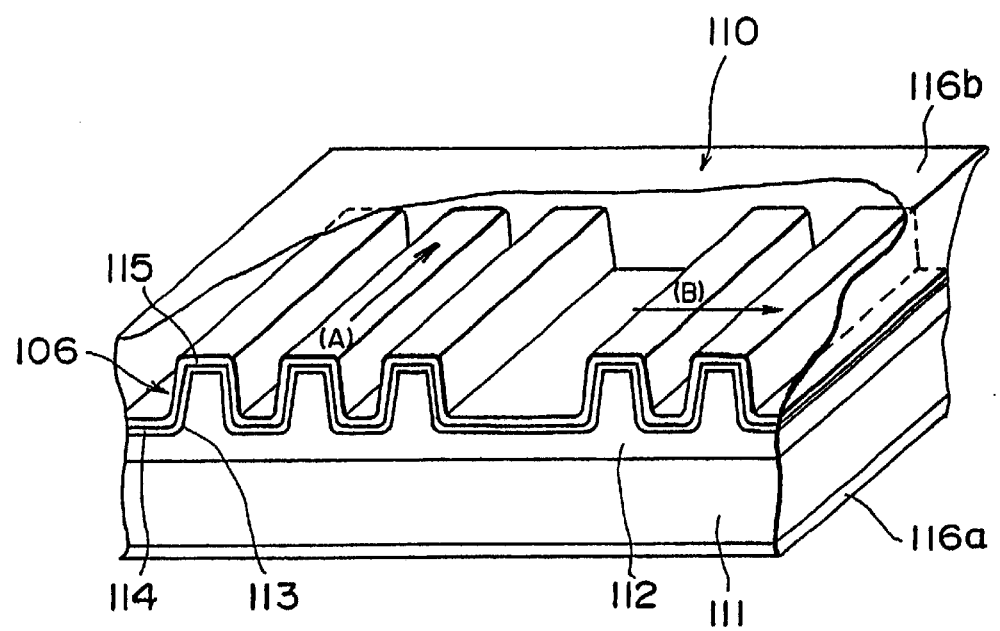
F I G. 17
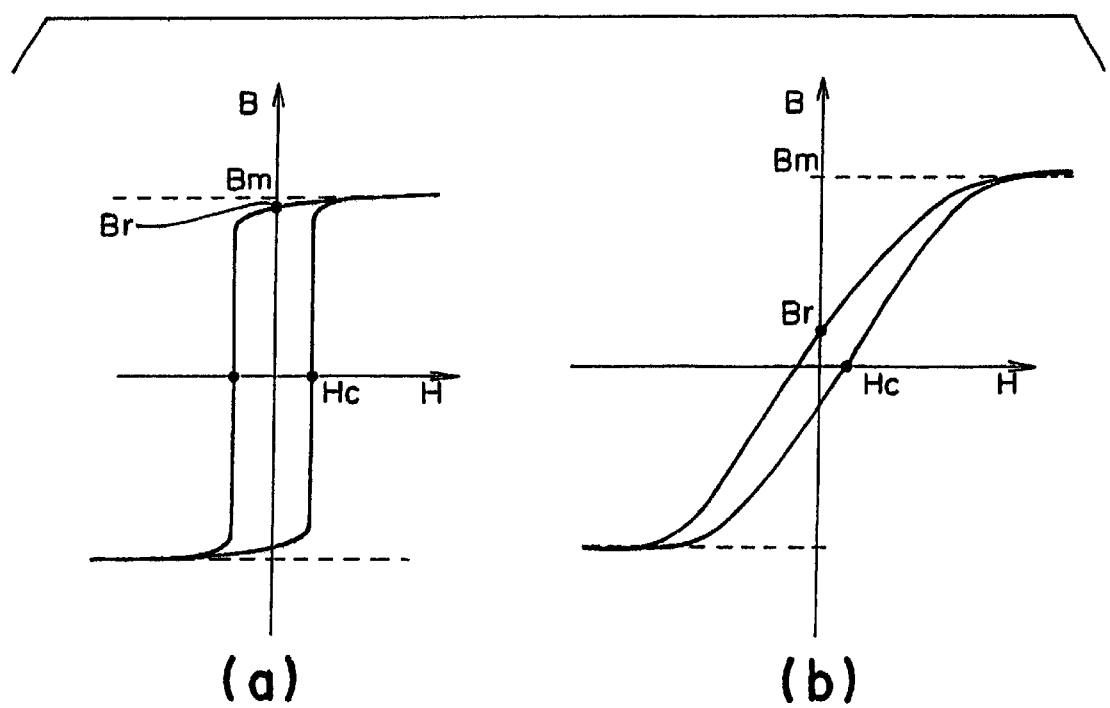
F I G. 18

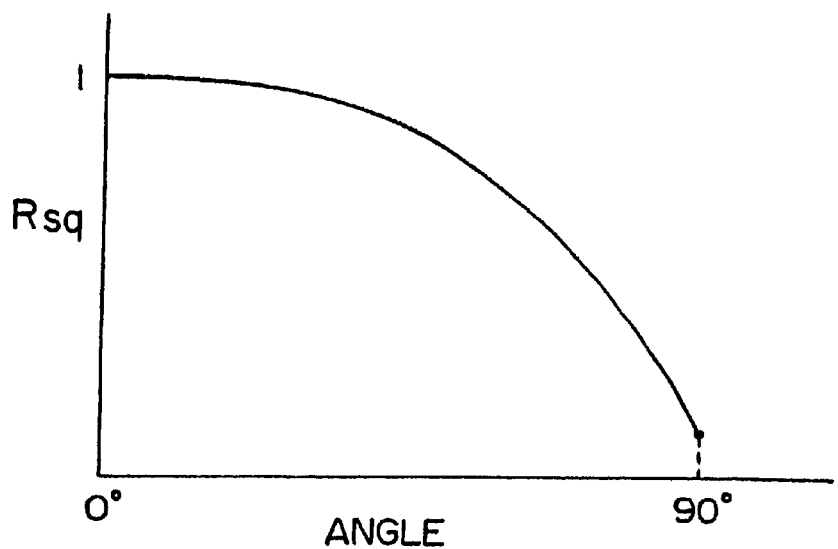
F I G. 19
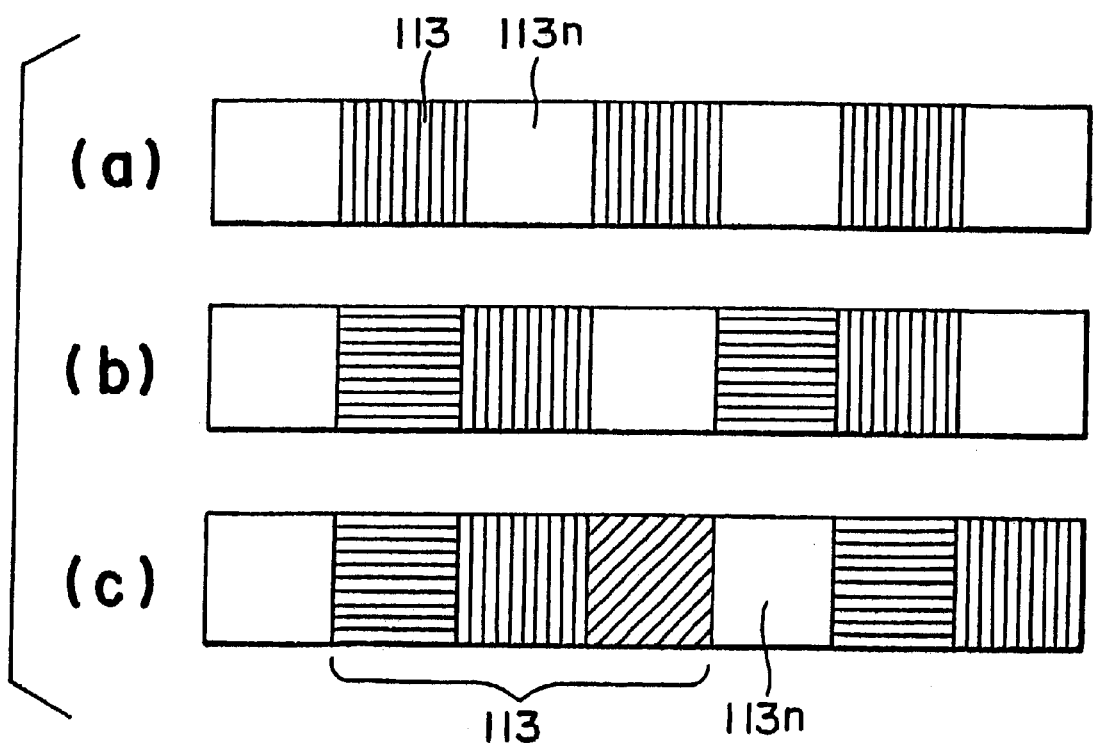
F I G. 20

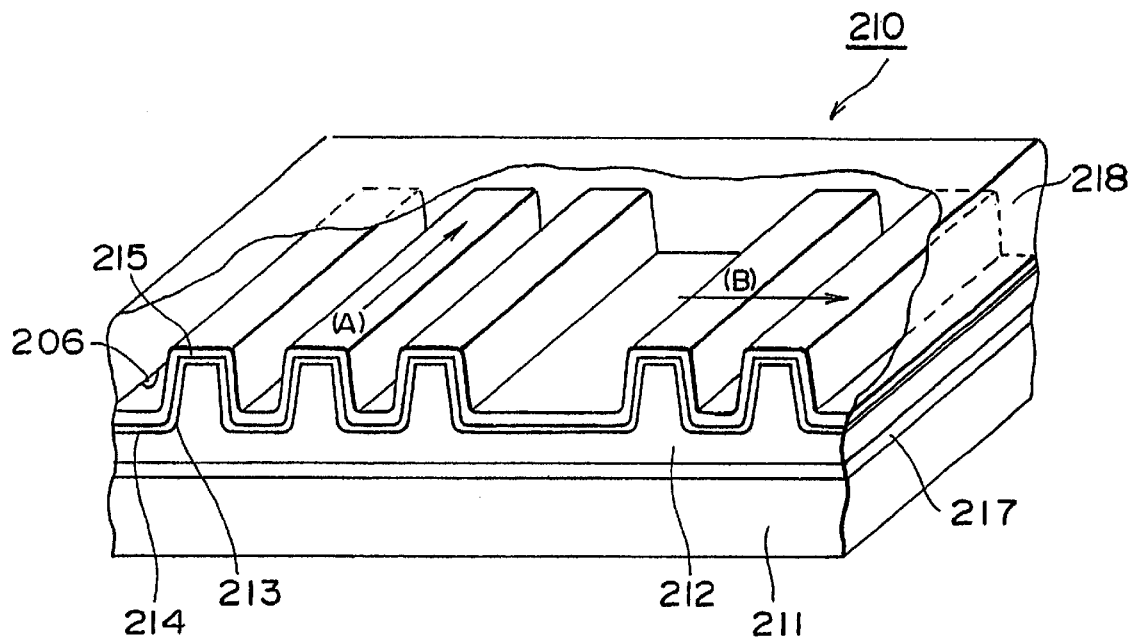
F I G. 25
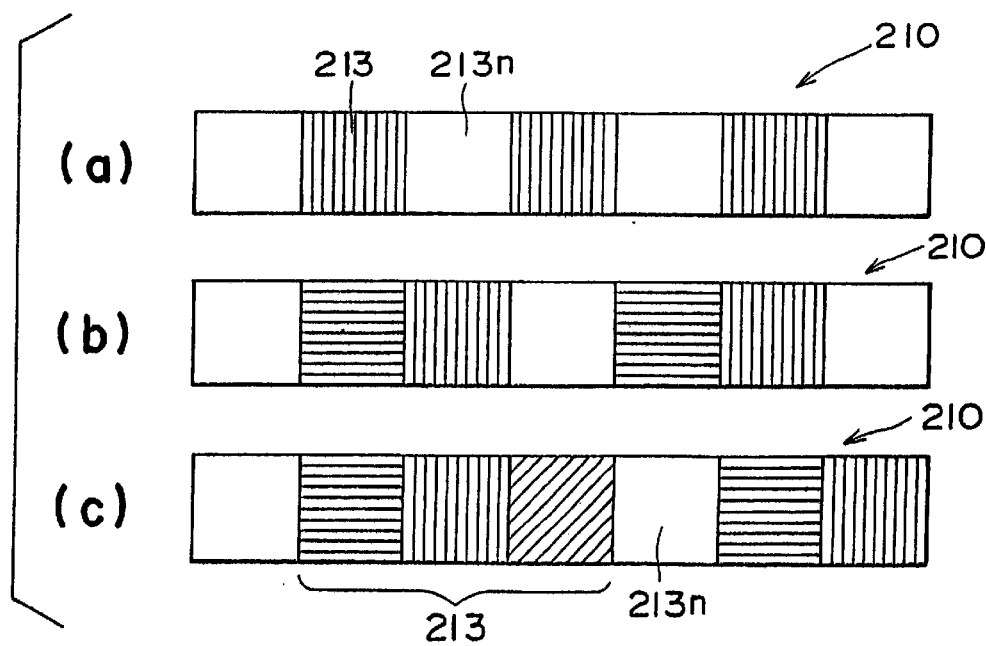
F I G. 26

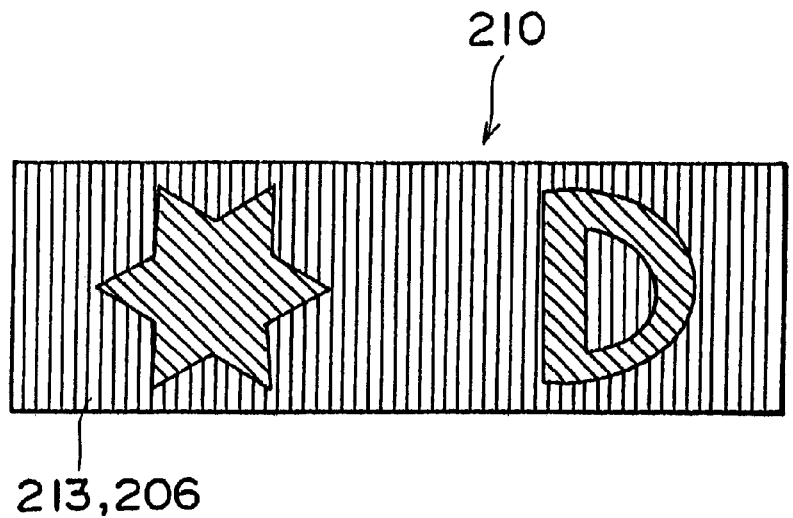
F I G. 27
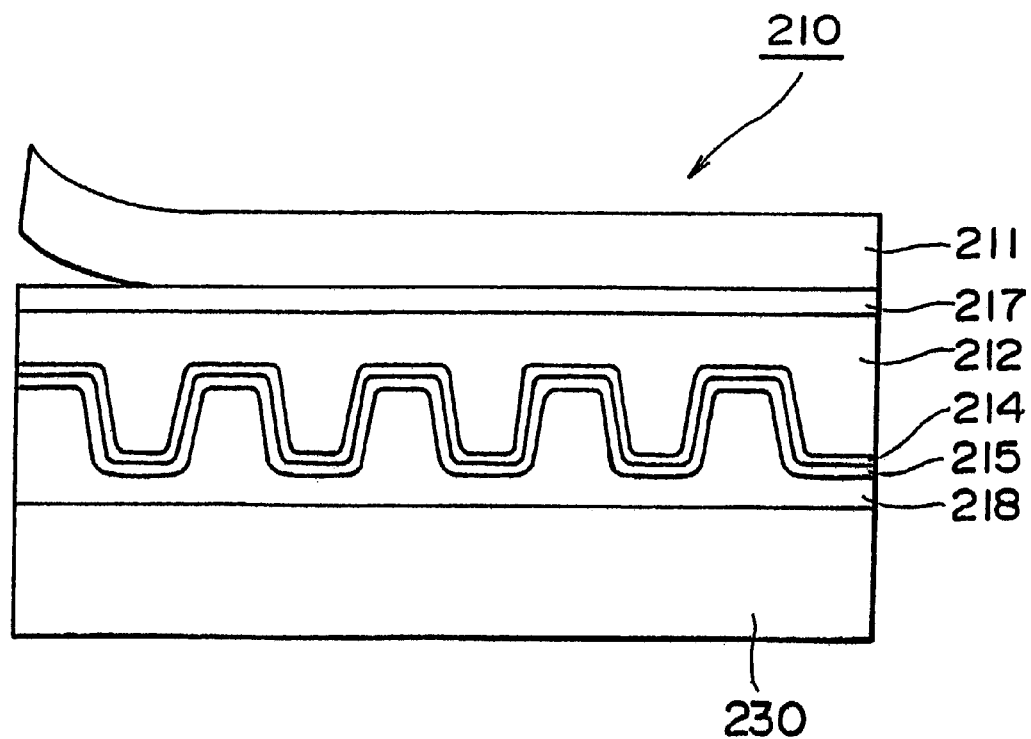
F I G. 28

INFORMATION RECORDED MEDIUM, DEVICE FOR READING THE INFORMATION, INFORMATION RECORDED MEDIUM TRANSFER FOIL, AND METHOD FOR PRODUCING INFORMATION RECORDED MEDIUM

TECHNICAL FIELD

The present invention relates to an information recording medium for realizing a high-value-added article, such as a prepaid card, a gift certificate, a bond certificate, a software package or the like, with additional control information for preventing counterfeiting, an information reader for reading information from the information recording medium, an information recording medium transfer foil, and a method of fabricating the information recording medium.

BACKGROUND ART

Prepaid cards and cash cards are information recording mediums. Prepaid cards include telephone cards issued by NTT (Nippon Telegraph and Telephone Co.), pinball game cards issued by Japan Card System Co. and commute tickets, tickets and prepaid cards issued by transportation companies. Cash cards include bank cash cards issued by banks and credit cards issued by credit institutions.

When checking up whether an information recording card is authentic, magnetic data recorded on the information recording card is read and checked or a portrait attached to the information recording card or a hologram recorded on the information recording card is examined. Control information relating to the fabrication and use of the information recording card including date of fabrication, the number of message units, a secret number and the like is recorded magnetically and the magnetic data is rewritten.

Bar codes representing control information and recorded by advanced printing technology or holography are used to prevent counterfeiting gift certificates, beer tokens, certificates, such as stock certificates and public bond certificates, and the like.

Holograms are used in recent years to authenticate pieces of software, such as computer programs.

Nevertheless, those high-value-added articles are subject to counterfeiting and dishonest alteration that cause a significant social problem.

An invention, "Recording Card and Authenticity Identifying Apparatus" (Japanese Patent Application No. Hei 5-094846) applied for patent by Iwasaki Tushinki K.K. (Conventional art 1) is measures to prevent the counterfeiting and dishonest alteration of the information recorded on prepaid cards and cash cards.

The recording card of the conventional art 1 has an ordinary first magnetic recording region, and a second recording region of an amorphous ferromagnetic layer. A security code is recorded in the second recording region. The authenticity identifying apparatus is capable of magnetically detecting punched holes indicating the number of message units or the like. Therefore, the dishonest alteration of the recorded information, such as concealing the punched holes by a screening member, can be easily found. The security code written to the second recording region is unrewritable and inerasable and hence the authenticity of the recording card can be identified by the security code.

An invention, "information recording medium" (Japanese Patent Application No. Hei 8-276878, Sep. 30, 1998) applied for patent by Iwasaki Tushinki K.K. (Conventional art 2) is an information recording medium having, in combination, an amorphous ferromagnetic thin film and a hologram.

The conventional art 2 uses the amorphous ferromagnetic thin film and the hologram in combination. The information recorded in the amorphous ferromagnetic thin film can be magnetically read.

An invention, "Magnetic Plate with Magnetic Pattern and Method of fabricating the Same" (Japanese Patent Application No. Hei 8-231288, filed Aug. 14, 1998) applied for patent by Iwasaki Tushinki K.K. (Conventional art 3) is a method capable of easily adding signals to those magnetic members.

The conventional art 3 applies an ink to a surface of a flat base sheet or forms projections or depressions in a part of the surface of the flat base sheet by a chemical or physical method to form a smooth blank region and a pattern region respectively having different magnetic characteristics, and uses the difference between the blank region and the pattern region for the magnetic reading of recorded information.

A hologram is used to prevent counterfeiting, for example, by placing a diffraction grating having ridges and furrows of sizes on the order of micrometers on a surface of a film, forming a metal thin film over the diffraction grating and producing a characteristic pattern, such as a three-dimensional image or an interference color. A metal that reflects light moderately, such as inexpensive aluminum, is used and any magnetic metal is not used. The formation of the minute ridges and furrows of sizes on the order of micrometers requires highly advanced techniques and such ridges and furrows cannot be easily counterfeited. Nevertheless, such minute ridges and furrows have been counterfeited in recent years.

A method of writing magnetic data relating to the prior art 2 ("Information Recording Medium", Japanese Patent Application No. Hei 3-27687) uses magnetic members of different materials or records information by an arrangement of magnetic members. Thus, an amorphous magnetic material must be used and signals must be written to a magnetic member in addition to a hologram.

DISCLOSURE OF THE INVENTION

It is an object of the present invention to provide an information recording medium free of the disadvantage of the conventional high-added-value articles, such as prepaid cards, cash cards and certificates, that the conventional high added-value articles can be comparatively easily counterfeited or forged and capable of being easily attached or transferred to cards and various high-added-value articles, an information reader for reading information recorded on the information recording medium, an information recording medium transfer foil and a method of fabricating the information recording medium.

According to a first aspect of the present invention, an information recording medium comprises: a base member; a resin layer having a surface having a pattern region provided with a three-dimensional diffraction grating or a holographic pattern; and a ferromagnetic thin film formed on the resin layer; wherein the ferromagnetic thin film has a magnetic characteristic dependent on the diffraction grating or the holographic pattern of the pattern region.

An information reader according to a second aspect of the present invention that reads information recorded on an information recording medium comprising a base member, a resin layer having a pattern region provided with a three-dimensional diffraction grating or a holographic pattern, and a ferromagnetic thin film formed on the resin layer, wherein the ferromagnetic thin film has a magnetic characteristic subject to the diffraction grating or the holographic pattern of the pattern region, comprises: an exciting means for ac-exciting the pattern region of the information recording medium in a predetermined direction; a magnetic head means for scanning the pattern region along the predetermined direction and reading the variation of magnetic flux provided by the information recording medium excited by ac-excitation; and a driving means for driving the information recording medium relative to the magnetic head means or the magnetic head means relative to the information recording medium to move the information recording medium or the magnetic head continuously or intermittently at a moving speed far lower than the scanning speed of the magnetic head means in a feed direction perpendicular to a scanning direction in which the magnetic head means moves relative to the information recording medium for scanning.

The information reader may further comprise a read pattern storing means for reading output signals provided by the magnetic head means in synchronism with the scanning operation of the magnetic head means and the driving operation of the driving means and temporarily storing a read pattern corresponding to the diffraction grating or the holographic pattern formed in the pattern region; a reference pattern storing means for storing an output signal provided by the magnetic head means and corresponding to the diffraction grating or the holographic pattern of a reference pattern region as a reference pattern; and a comparing means for comparing the read pattern read and stored in the pattern storing means and the reference pattern stored in the reference pattern storing means; wherein the authenticity of the information recording medium is verified by the magnetic characteristic of the ferromagnetic thin film determined on the basis of the result of comparison made by the comparing means.

According to a third aspect of the present invention, a counterfeiting preventing sheet comprises: an information recording medium including a base member, a resin layer having a pattern region provided with a three-dimensional diffraction grating or a holographic pattern, and a ferromagnetic thin film overlying the resin layer and having a magnetic characteristic dependent on the diffraction grating or the holographic pattern of the pattern region; and a backing sheet in which the information recording medium is embedded; wherein the backing sheet has open parts formed at intervals to expose parts of the information recording medium therein, and covering parts extending between the open parts to cover parts of the information recording medium.

According to a fourth aspect of the present invention, an information recording medium transfer foil comprises: a base member; a resin layer formed on the base member and having a pattern region provided with a three-dimensional diffraction grating or a holographic pattern; a ferromagnetic thin film formed on the resin layer; and a heat-sealable layer or an adhesive layer formed on the ferromagnetic thin film; wherein the ferromagnetic thin film has a magnetic characteristic dependent on the diffraction grating or the holographic pattern of the pattern region.

According to a fifth aspect of the present invention, an information recording medium fabricating method comprises the steps of: fabricating an information recording medium transfer foil comprising a base member, a resin layer having a pattern region provided with a three-dimensional diffraction grating or a holographic pattern, a ferromagnetic thin film formed on the resin layer and having a magnetic characteristic dependent on the diffraction grating or the holographic pattern of the pattern region, and a heat-sealable layer or an adhesive layer formed on the ferromagnetic thin film; and transferring the information recording medium transfer foil to a carrying medium.

BRIEF DESCRIPTION OF THE DRAWINGS

FIG. 17 is a partly sectional perspective view of a counterfeiting preventing thread in a second embodiment according to the present invention;

FIG. 18 is a graph showing magnetic hysteresis curves representing the magnetic characteristics of ferromagnetic thin films;

FIG. 19 is a graph showing the dependence of rectangularity ratio on the direction of a magnetic field;

FIG. 20 is a view of diffraction gratings;

FIG. 25 is a partly cutaway perspective view of an information recording medium transfer foil in a third embodiment according to the present invention;

FIG. 26 is a view of a diffraction grating;

FIG. 27 is a pattern formed by incorporating a character or image information into a holographic region; and FIG. 28 is a sectional view of assistance in explaining a procedure for attaching an information recording medium transfer foil to a base member.

BEST MODE FOR CARRYING OUT THE INVENTION

First Embodiment

Figure 1:
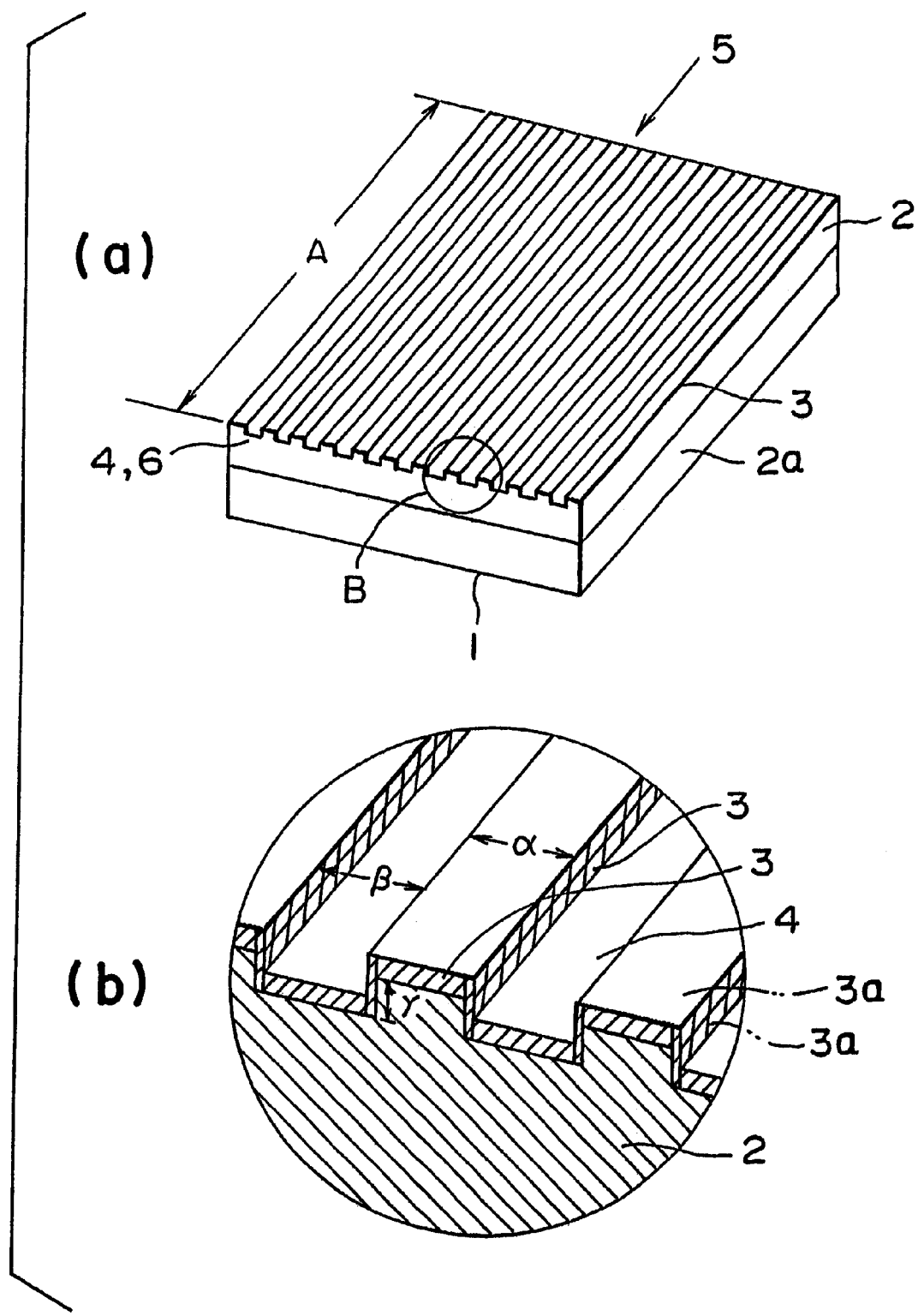
FIG. 1 is a fragmentary typical perspective view of an information recording medium in Example 1 of a first embodiment of the present invention.

An information recording medium in a first embodiment according to the present invention has a base sheet, a resin layer having a surface provided with a holographic pattern or a diffraction grating for the optical authenticity verification, and a ferromagnetic thin film for magnetic authenticity verification. The ferromagnetic thin film is formed directly on the surface of the resin layer or on a nonmagnetic metal film formed on the surface of the resin layer.

The ferromagnetic thin film is formed by vapor-phase growth process, such as an evaporation process or a sputtering process. Therefore the magnetic characteristic of the ferromagnetic thin film is greatly dependent on its surface condition.

The ferromagnetic thin film has a shape conforming to the surface of the resin layer provided with the diffraction grating or the holographic pattern. If necessary, a reflective nonmagnetic metal film may be formed between the ferromagnetic thin film and the resin layer or on the ferromagnetic thin film. The reflective nonmagnetic metal film reflects light, the lustrous color of the nonmagnetic metal film is visible without being affected by the color of the ferromagnetic thin film, which gives the information recording medium an appearance analogous with that of a general hologram.

The base sheet is a PET resin film or the like. The resin layer is formed on the base sheet and the holographic pattern is formed in the resin layer. The base sheet may be a sheet of a metal, glass or a material other than a PET resin, provided that the sheet can be combined with various mediums by bonding, transfer or insertion.

The material of the ferromagnetic thin film may be a soft magnetic material or a hard magnetic material, and may be a crystalline ferromagnetic material or an amorphous ferromagnetic material.

When the information recording medium is attached or transferred to an object with the ferromagnetic thin film facing the object, the base sheet, i.e., a resin film or a glass sheet, serves as a protective layer for protecting the hologram. When the information recording medium is attached to an object with the base sheet facing the object, it is desirable to form a protective layer of a transparent resin over the ferromagnetic thin film.

It is generally known that a flat plate has a shape anisotropy when parallel scratches or minute rectangles are formed in a pattern in the surface of the flat plate, and the flat plate has an easy direction of magnetization along the scratches or the pattern.

The aforesaid Conventional art 3, "Magnetic Plate with Magnetic Pattern and Method of fabricating the Same" (Japanese Patent Application No. Hei 8-231288), applies an ink to a flat base sheet or forms ridges and furrows on a flat base sheet by a chemical or physical method to form a blank region and a pattern region respectively having different magnetic characteristics, and uses the difference between the blank region and the pattern region for the magnetic reading of recorded information.

The present invention forms a diffraction structure (a diffraction grating or a holographic pattern) by forming ridges and furrows of sizes on the order of micrometers on the surface of, for example, a resin layer in a regular or irregular arrangement in a holographic region ( pattern region) and forms a ferromagnetic thin film over the holographic region. The ferromagnetic thin film has a specific magnetic characteristic dependent on the pattern of the holographic region.

Changes in magnetic characteristics signify changes in coercive force, saturation magnetic flux density, rectangularity ratio and the like. The magnetic characteristics of the information recording medium of the present invention are featured by the combination of the intrinsic magnetic characteristic of a magnetic material and the shape effect of the holographic region. A first mode of operation of the present invention is an information recording medium including a base sheet, such as a resin film, and a resin layer formed on the base sheet. Projections are formed regularly on the surface of the resin layer to define a holographic region. The ridges and furrows are formed in a predetermined regular arrangement in the entire holographic region and a ferromagnetic thin film is formed over the ridges and furrows. The information recording medium is cut in a predetermined shape, the information recording medium is bonded to or inserted in a high-value-added article of paper or a plastic material to prevent the counterfeiting of the high-value-added article. The information recording medium is embedded in a high-value-added article near the surface of the same. If it is desired to recognize the holographic pattern optically, at least a part of the information recording medium must be exposed in the surface of the high-value-added article.

When a thin resin layer provided with a holographic region is attached beforehand to a thicker base sheet, a magnetic film is formed over the thin resin layer and an adhesive layer is formed over the magnetic film, the resin layer having the holographic region can be transferred to an article of an optional shape.

In the first embodiment, the holographic region is formed in the entire surface or a part of the surface of the information recording medium.

When the holographic pattern is formed in the entire or a part of the surface of the information recording medium such that the ridges and the furrows forming the holographic pattern extend in parallel to the direction of reading magnetic flux and the ferromagnetic film is formed directly on the holographic pattern, the axis of easy direction of magnetization is oriented strongly and the ferromagnetic thin film exhibit a magnetic characteristic different from that will be exhibited by a ferromagnetic thin film formed on a flat surface of a PET resin film or a mirror-finished surface of a nonmagnetic plate.

When the holographic region is divided into plural sections, diffraction gratings of different directions are formed in the sections, respectively, the sections are arranged isotropically and then the ferromagnetic thin film is formed over the holographic region, intrasurface anisotropy disappears and the information recording medium exercises the same magnetic characteristic regardless of reading direction.

A magnetic signal read magnetically from the information recording medium can be used for magnetic authenticity verification and the holographic pattern visually recognized can be used for optical authenticity verification.

A second mode of operation of the present invention is an information recording medium including a base sheet, such as a resin film, and a resin layer formed on the base sheet and having a surface having a pattern region, i.e., a holographic region, and a blank region. Ridges and furrows are formed in a regular arrangement in a part of the surface of the resin layer to form the holographic region. Diffraction gratings are arranged regularly in the entire holographic region. A ferromagnetic thin film is formed over the entire surface of the resin layer including the holographic region and the blank region. Thus, the information recording medium has two different magnetic characteristics dependent on the holographic region and the blank region. The difference in magnetic characteristic between those regions is used for writing data.

Similarly to the information recording medium in the first mode, the information recording medium in the second mode can be attached to, inserted in or transferred to a high-value-added article.

The blank region and the holographic region of the information recording medium in the second mode are formed according to a predetermined rule. Different magnetic signals are provided by parts of the information recording medium respectively corresponding to the blank region and the holographic region, and the difference between the magnetic signals is used as data.

When the holographic region is formed such that the diffraction gratings forming holographic patterns extend in parallel to the direction of reading magnetic flux and the ferromagnetic thin film is formed directly on the holographic pattern, the axis of easy direction of magnetization is oriented strongly in the holographic region and the parts of the ferromagnetic thin film respectively corresponding to the blank region and the holographic region exhibit different magnetic characteristics, respectively, the magnetic characteristics are discriminated to provide a signal.

A magnetic signal read magnetically from the information recording medium can be used for magnetic authenticity verification and the holographic pattern visually recognized can be used for optical authenticity verification. Thus magnetic data representing various pieces of control information including date of manufacture and secret number can be recorded on a high-value-added article.

A third mode of operation of the present invention is an information recording medium including a resin layer having a surface provided with a holographic region provided with at least two different holographic patterns, such as diffraction gratings of different angles, and a soft magnetic thin film formed directly on the resin layer. Thus the information recording medium has at least two different magnetic characteristics dependent on the holographic patterns and the difference between the magnetic characteristics can be used for writing data.

Similarly to the information recording medium in the first mode, the information recording medium in the third mode can be attached to, inserted in or transferred to a high-value-added article.

The resin layer of the information recording medium in the third mode is provided with the tow or more different holographic patterns that provide the information recording medium with different magnetic characteristics, which can be used as data. Different holographic patterns differ from each other in the angle (direction) of ridges and furrows forming the hologram or the width of the furrows between the ridges. The magnetic characteristic is dependent on the holographic pattern.

For example, when sections of a holographic pattern of ridges and furrows, i.e., a diffraction grating, extending in a first direction and sections of a holographic pattern of ridges and furrows, i.e., diffraction grating, extending in a second direction perpendicular to the first direction are arranged alternately, the axis of easy direction of magnetization of the sections having the ridges and furrows extending in parallel to he direction of reading magnetic flux is oriented more strongly than that of the sections having the ridges and furrows extending perpendicularly to the direction of reading magnetic flux. Thus, magnetic characteristics of parts of the information recording medium are discriminated to provide a signal.

A magnetic signal read magnetically from the information recording medium can be used for magnetic authenticity verification and the holographic pattern visually recognized can be used for optical authenticity verification. Thus magnetic data representing various pieces of control information including date of manufacture and secret number can be recorded on a high-value-added article.

A fourth mode of operation of the present invention is an information recording medium including a resin layer having a surface provided with a holographic region in which image information, such as a portrait, a three-dimensional picture or characters, is formed, and a ferromagnetic thin film formed directly on the resin layer. Thus information represented by a change in magnetic characteristics due to the image information written to the holographic region is recorded on the information recording medium.

Similarly to the information recording medium in the first mode, the information recording medium in the fourth mode can be attached to, inserted in or transferred to a high-value-added article.

In the fourth mode, the image information, such as a portrait, a three-dimensional picture or a character, is formed in the uniform holographic region of the resin layer. Parts of the information recording medium respectively corresponding to the holographic region and a region other than the holographic region has different magnetic characteristics, respectively, and magnetic characteristic changes continuously or discontinuously in a region provided with an image depending on the morphology of the image or a manner of forming the image information. Thus a magnetic characteristic corresponding to the image information represented by the holographic pattern is recorded on the information recording medium provided with the resin layer having the holographic region.

Suppose that an information recording medium includes a ferromagnetic thin film and a resin layer having a uniform holographic region provided with a round holographic pattern, and ridges and furrows forming the uniform holographic region is inclined at 45° to the direction of reading magnetic flux. The round holographic pattern is formed in the holographic region by ridges and furrows extending in parallel to the direction of the reading magnetic flux. Since parts of the information recording medium respectively corresponding to the uniform holographic region and the round holographic pattern have different magnetic characteristics, respectively, the magnetic characteristic corresponding to the round holographic pattern can be discriminated from that of the uniform holographic region when the holographic region is scanned with a magnetic head. Thus, the round holographic pattern gives the information recording medium an intrinsic magnetic characteristic.

A magnetic signal read magnetically from the information recording medium can be used for magnetic authenticity verification and the holographic pattern visually recognized can be used for optical authenticity verification. Thus the magnetic characteristic represented by the image information written to the holographic region is read, and the read magnetic characteristic is compared with that of an authentic article for highly precise authenticity verification.

The present invention uses a holographic pattern directly for recording a magnetic signal and hence any operation for recording additional information is not necessary. The information recording medium formed by a method employing holography is a novel security device and it is very difficult to counterfeit the security device.

According to the present invention, either an amorphous magnetic film or a crystalline ferromagnetic film can be made to exhibit a distinguishing characteristic by properly forming a diffraction grating or a holographic pattern and authenticity verification can be achieved by reading the distinguishing characteristic. Magnetic data can be recorded on the information recording medium by forming different diffraction gratings or holographic patterns in the holographic region or by forming a holographic image in the holographic region.

The evaluation of the magnetic characteristic of the information recording medium achieves the evaluation of both the diffraction grating and the hologram. If a counterfeit of the information recording medium of the present invention is fabricated, the workmanship of both the hologram and the magnetic film of the counterfeit can be evaluated through the evaluation of the magnetic characteristic of the counterfeit. Therefore, the counterfeit can be easily distinguished from the authentic information recording medium unless both the hologram and the magnetic film thereof are satisfactory. Thus, it is very difficult to counterfeit the information recording medium of the present invention and the present invention is capable of realizing high security.

EXAMPLES

Examples of the present invention will be described hereinafter.

Example 1

Referring to FIGS. 1(a) and 1(b), an information recording medium 1 in Example 1 has a base sheet 2a and a resin layer 2 formed on the base sheet 2a. A ridge-furrow structure 4 consisting of alternate ridges and furrows is formed in a holographic region 6, i.e., a pattern region, in a diffracting structure of ridges and furrows (a diffraction grating or a holographic pattern). The ridge-furrow structure 4 forming a diffraction grating or a holographic pattern is formed in the entire surface of the resin layer 2. An iron ferromagnetic thin film (ferromagnetic thin film) 3 having a thickness of 0.2 $\mu$m is formed on the resin layer 2. A magnetic signal provided by the ferromagnetic thin film 3 when the ferromagnetic thin film was magnetized by ac-excitation by an information reader shown in FIG. 2 was examined. FIG. 1(b) is an enlarged view of a part B of the information recording medium 1 shown in FIG. 1(a).

Figure 2:
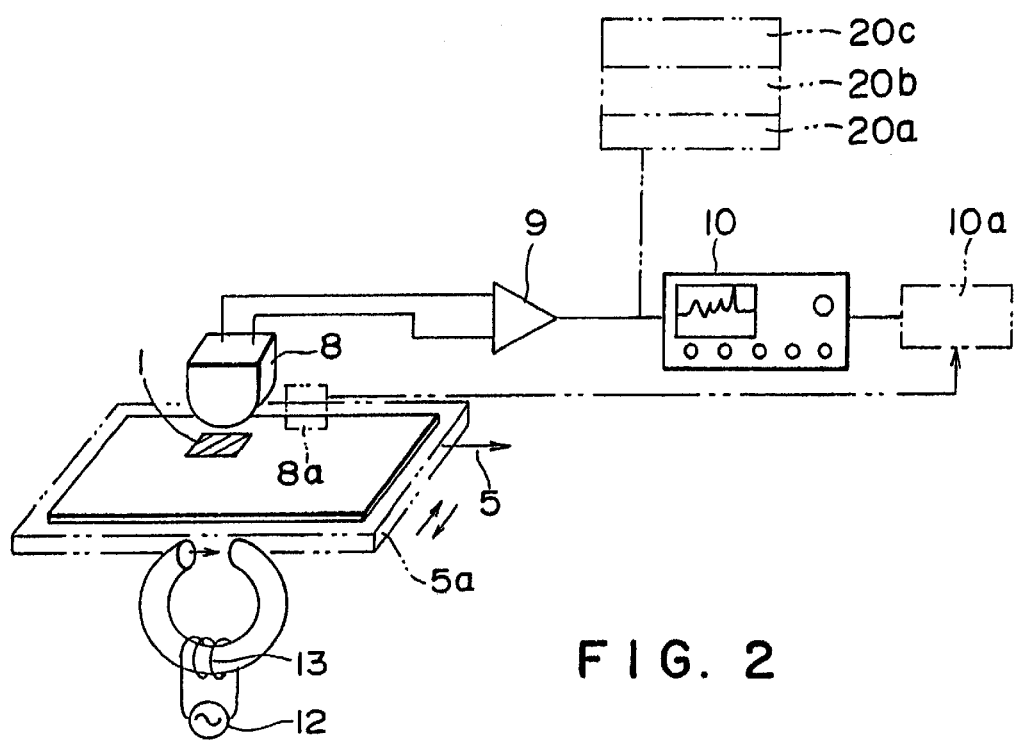
FIG. 2 is a block diagram of AN information reader for reading information from information recording mediums in Examples 1 to 4 and Comparative example 1.

Shown in FIG. 2 are a test article 1, such as the information recording medium 1, an ac power supply 12, an excitation coil 13, a magnetic head 8, an amplifier 9 and an oscilloscope 10. The arrow 5 indicates a scanning direction, i.e., the direction of an exciting magnetic field. A feed mechanism 5a for moving the information recording medium 1 relative to the magnetic head 8 or moving the magnetic head relative to the information recording medium 1 may be any suitable, generally known feed mechanism. The feed mechanism 5a may be a table capable of supporting the information recording medium 1 thereon.

A ridge-furrow structure similar to the ridge-furrow structure 4 of a positive resist that is used in semiconductor device fabricating processes may be formed on a mirror-finished surface of a silicon wafer for the confirmation of magnetic behavior. In most cases, a base sheet, a holographic pattern and a diffraction grating to be used for practical security insurance are formed of resins. The magnetic characteristic is affected scarcely by the material of the base sheet and is greatly subject to the shape of the base sheet, and the same pulse signal can be provided by a practical hologram.

Ridges and furrows forming the ridge-furrow structure 4 are extended in parallel to exciting magnetic flux The width $\alpha$ and the height $\gamma$ of the ridges of the ridge-furrow structure 4 are 2 $\mu$m and 0.4 $\mu$m, respectively, and the width $\beta$ of the furrows is 1 $\mu$m. The pattern of the ridge-furrow structure 4 assumed an interference color specific to a hologram.

Figure 3:
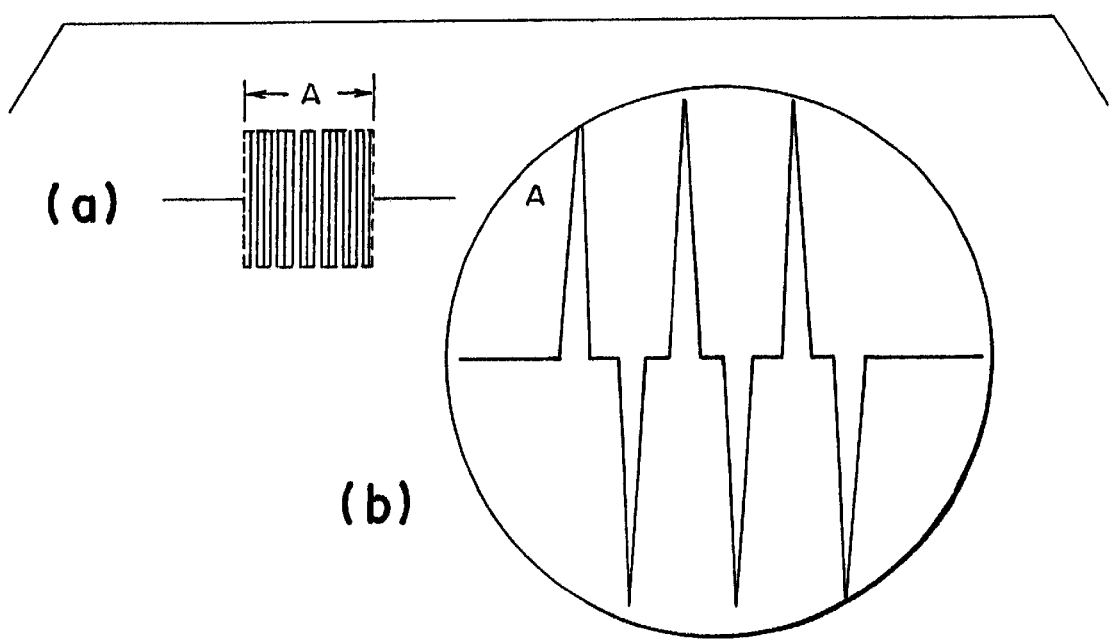
FIG. 3 is a diagram of a magnetic signal provided by the information recording medium in Example 1.
Figure 14:
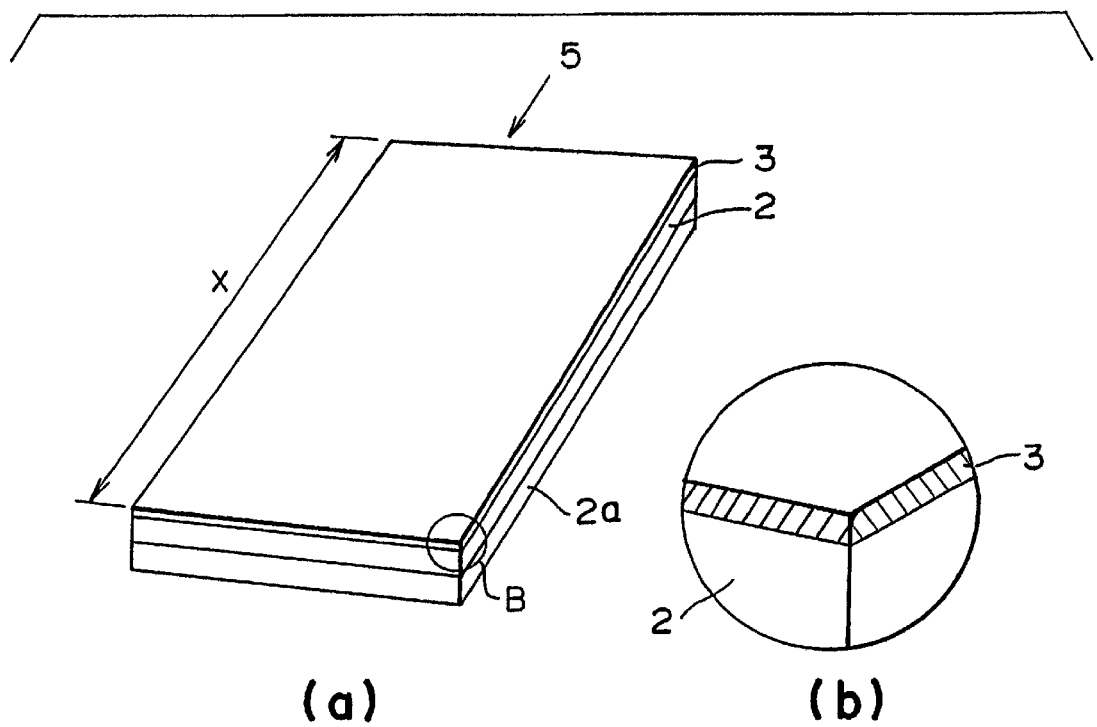
FIG. 14 is a typical perspective view of the information recording medium in Comparative example 1.
Figure 15:
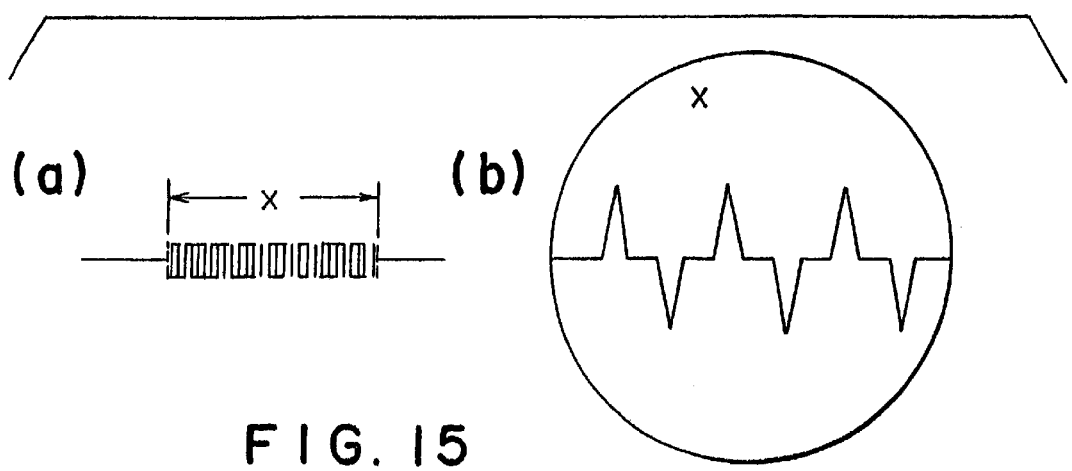
FIG. 15 is a diagram of a magnetic signal provided by the information recording medium in Comparative example 1.
Figure 16:
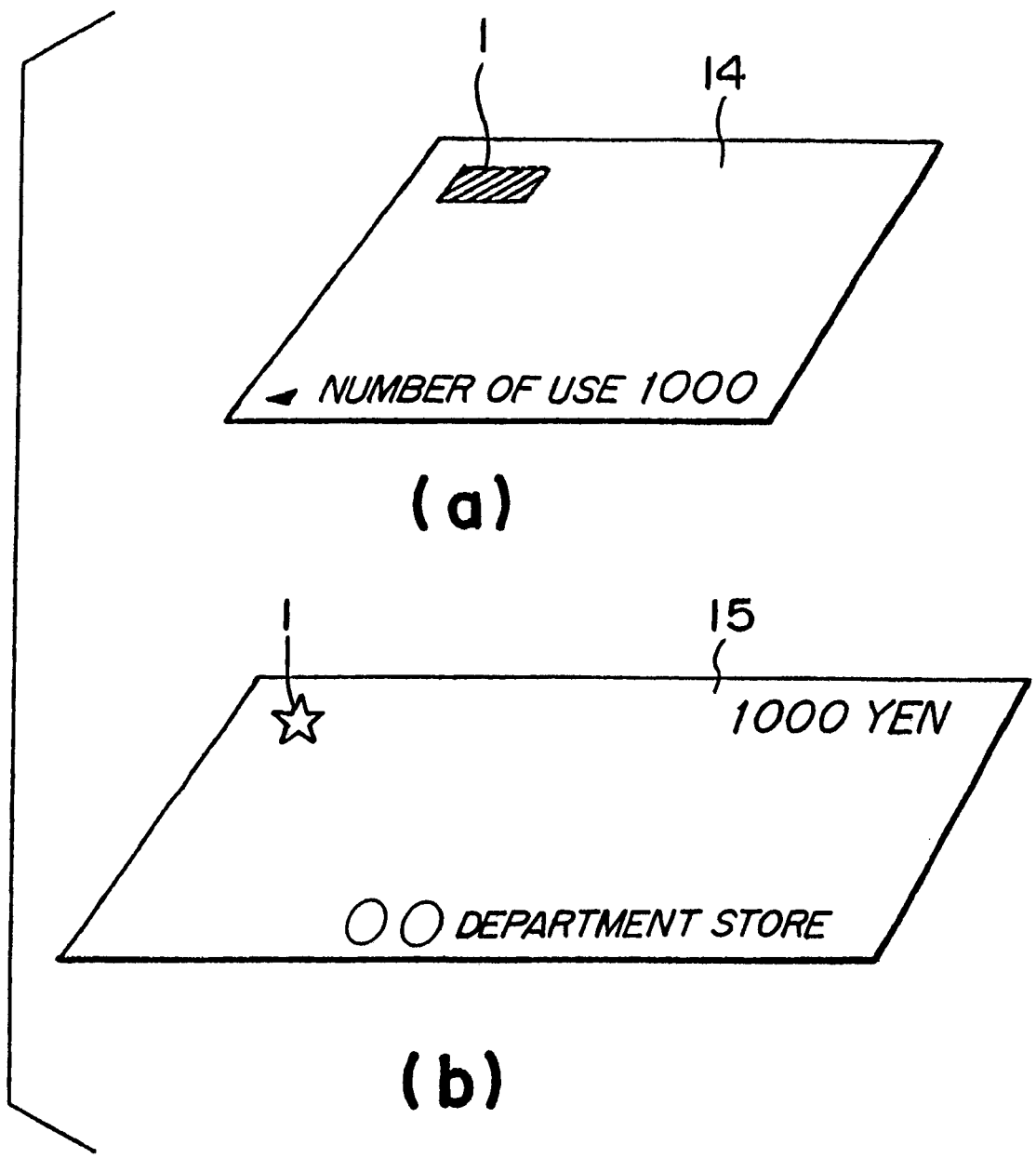
FIG. 16 is a perspective view of a card and a gift certificate provided with information recording mediums according to the present invention.

A section A of the ridge-furrow structure 4 affects the magnetic characteristic. A pulse signal as shown in FIG. 3(a) was produced. FIG. 3(b) is an enlarged view of a part of FIG. 3(a). An information recording medium in Comparative example 1 shown in FIG. 14 provided with the same magnetic thin film as that of the Example 1 provided a pulse signal of a low pulse height as shown in FIG. 15 and is incapable of providing a pulse signal of a high pulse height as that of the pulse signal shown in FIG. 3.

Figure 4:
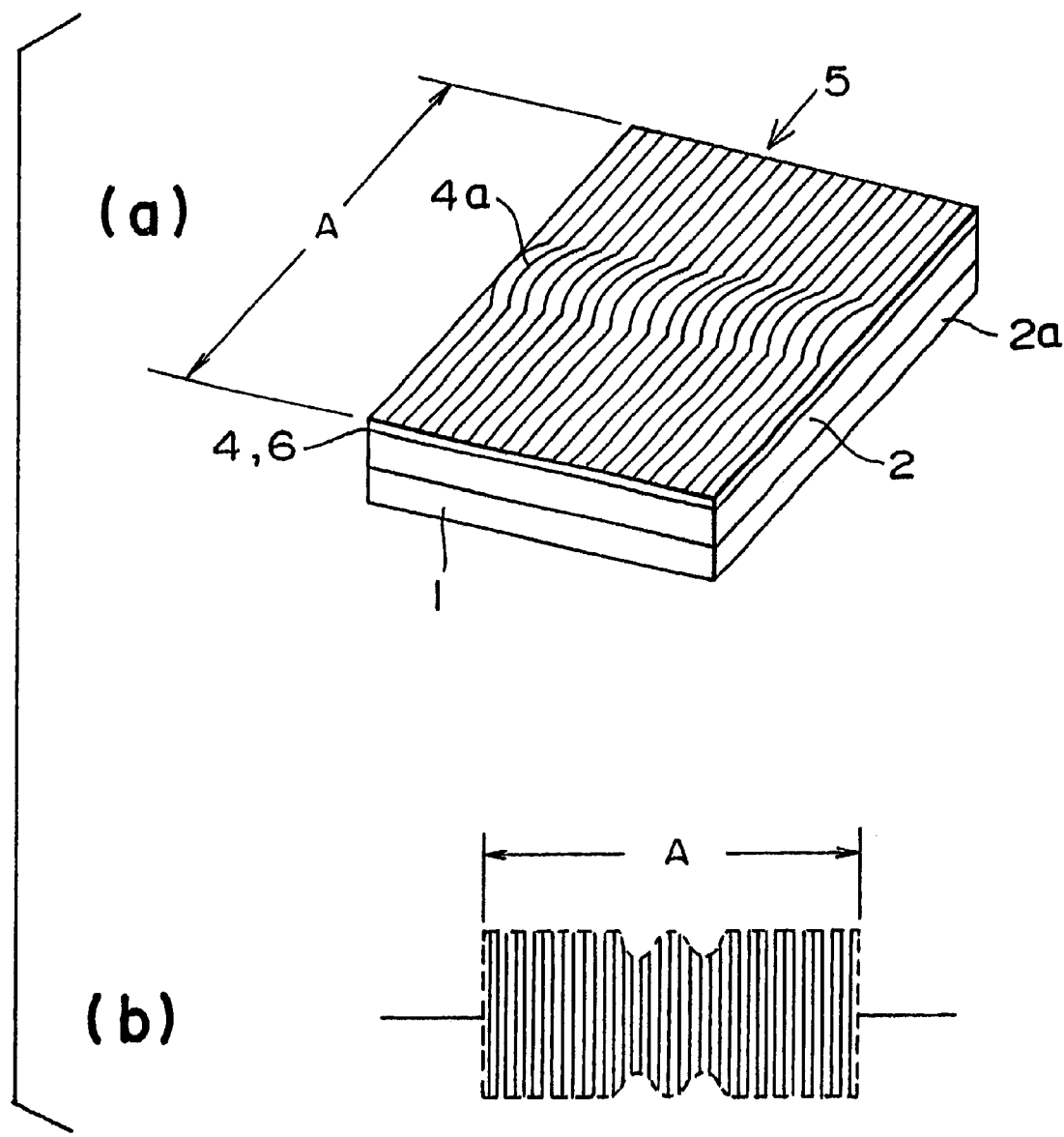
FIG. 4 is a perspective view of a modification of the information recording medium in Example 1.

FIG. 4(a) shows an information recording medium provided with a diffraction grating 4 having a regularly curved part 4a. FIG. 4(b) shows the waveform of a pulse signal produced when the information recording medium shown in FIG. 4(a) was scanned. Pulses corresponding to the regularly curved part 4a of the diffraction grating 4 have a slightly reduced pulse height.

Figure 5:
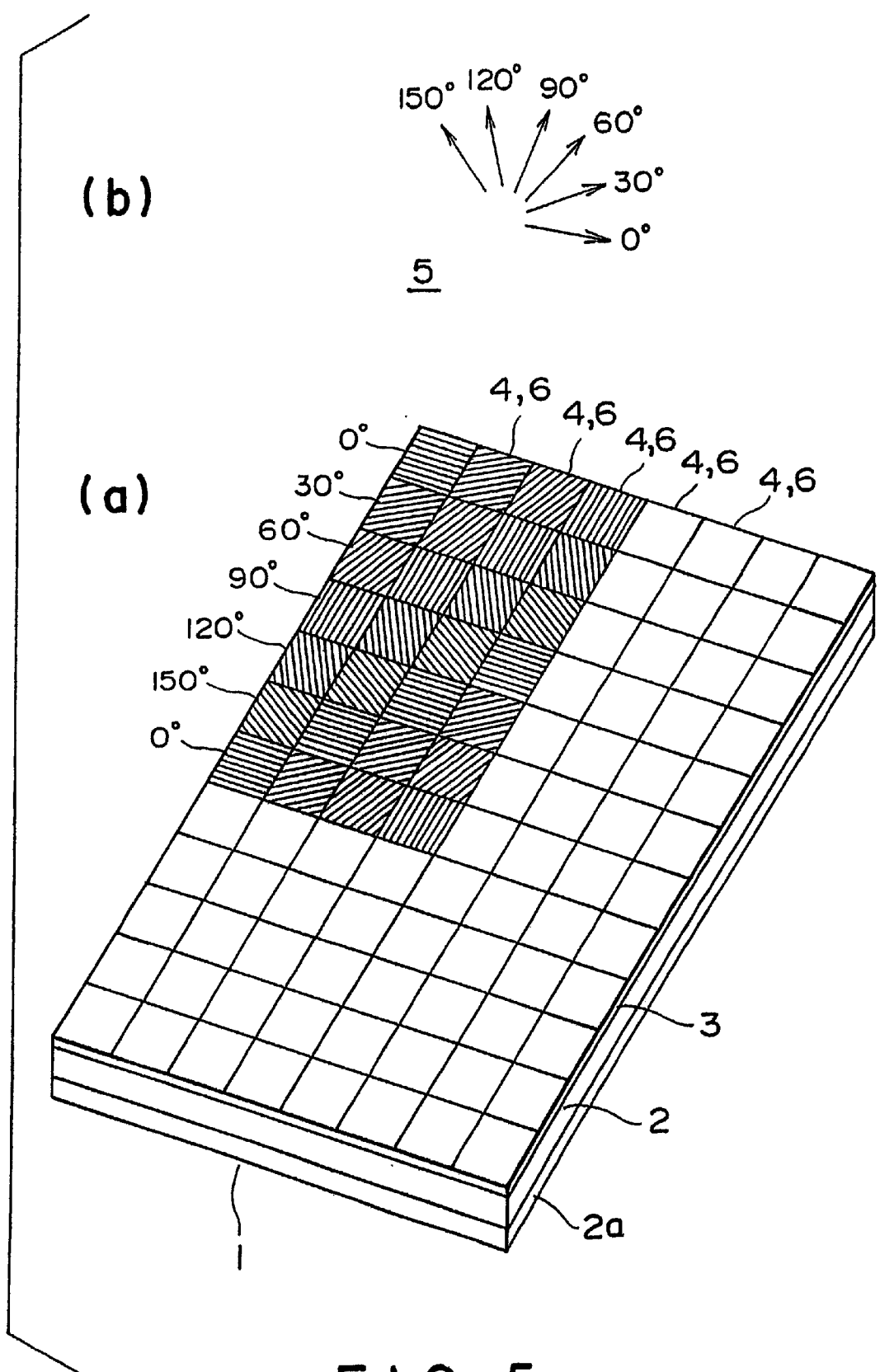
FIG. 5 is a perspective view of the information recording medium in Example 1 provided with holographic patterns arranged in different directions.

When a ridge-furrow structure 4 has plural ridge-furrow sections having ridges and furrows extending in different directions, respectively, as shown in FIG. 5, the same magnetic signals can be read regardless of the scanning direction. An information recording medium provided with the ridge-furrow structure 4 as shown in FIG. 5 has an isotropic magnetic characteristic. As shown in FIGS. 1(a) and 1(b), a reflective layer 3a may be formed on the ferromagnetic thin film 3 or between the resin layer 2 and the ferromagnetic thin film 3.

Example 2

Figure 6:
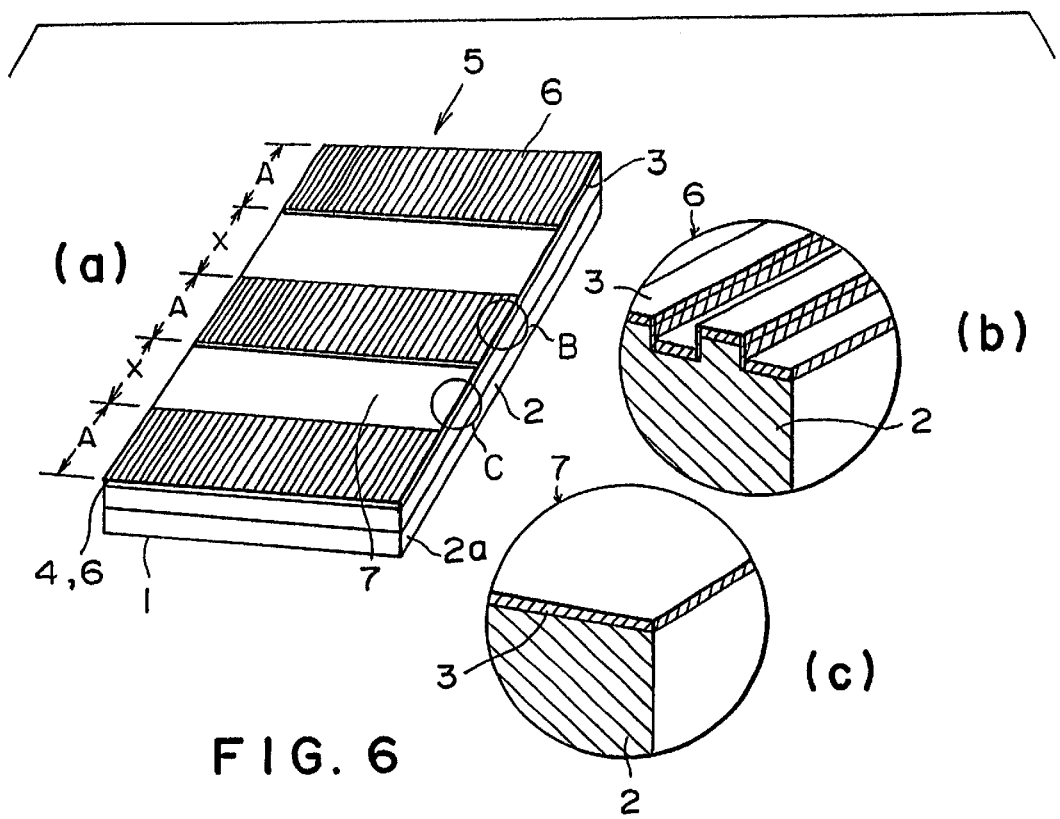
FIG. 6 is a typical view of the information recording medium in Example 2.

Referring to FIG. 6(a), an information recording medium 1 in Example 2 has a resin layer 2 having a surface having holographic regions 6 each having a ridge-furrow structure 4. As shown in FIG. 6(a), the holographic regions 6 (regions A) and blank regions 7 (region X) are arranged alternately. A 0.2 $\mu$m thick iron ferromagnetic thin film 3 is formed on the resin layer 2. The information recording medium 1 was scanned by the information reader shown in FIG. 2 with the ridges and furrows of the ridge-furrow structures 4 of the holographic regions 6 extended in parallel to exciting magnetic flux and a magnetic signal read from the information recording medium 1 was recorded. FIG. 6(b) is an enlarged view of a part B including the holographic region 6 in FIG. 6(a) and FIG. 6(c) is an enlarged view of a part C including the blank region 7 of FIG. 6(a).

The width and the height of the ridges of the ridge-furrow structure 4 are 1 μm and 0.4 μm, respectively, and the width of the furrows of the ridge-furrow structure 4 is 1 μm. The pattern of the ridge-furrow structure 4 assumed stripes of an interference color specific to a hologram.

Figure 7:
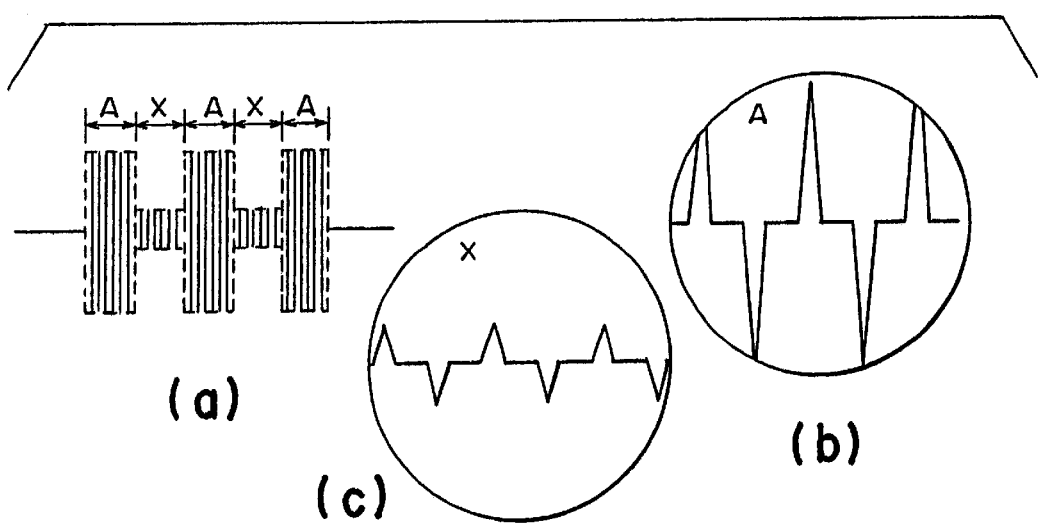
FIG. 7 is a diagram of a magnetic signal provided by the information recording medium in Example 2.

Parts provided with the holographic regions 6 (regions A) of the information recording medium 1 showed a magnetic characteristic represented by a pulse signal of a high pulse height shown in FIG. 7(*b*) and parts provided with the blank regions 7 (regions X) of the same showed a magnetic characteristic represented by a pulse signal of a low pulse height and a big pulse width shown in FIG. 7(*c*).

Thus the holographic patterns can be visually or optically recognized and magnetic signals indicating the holographic patterns can be obtained.

Example 3

Figure 8:
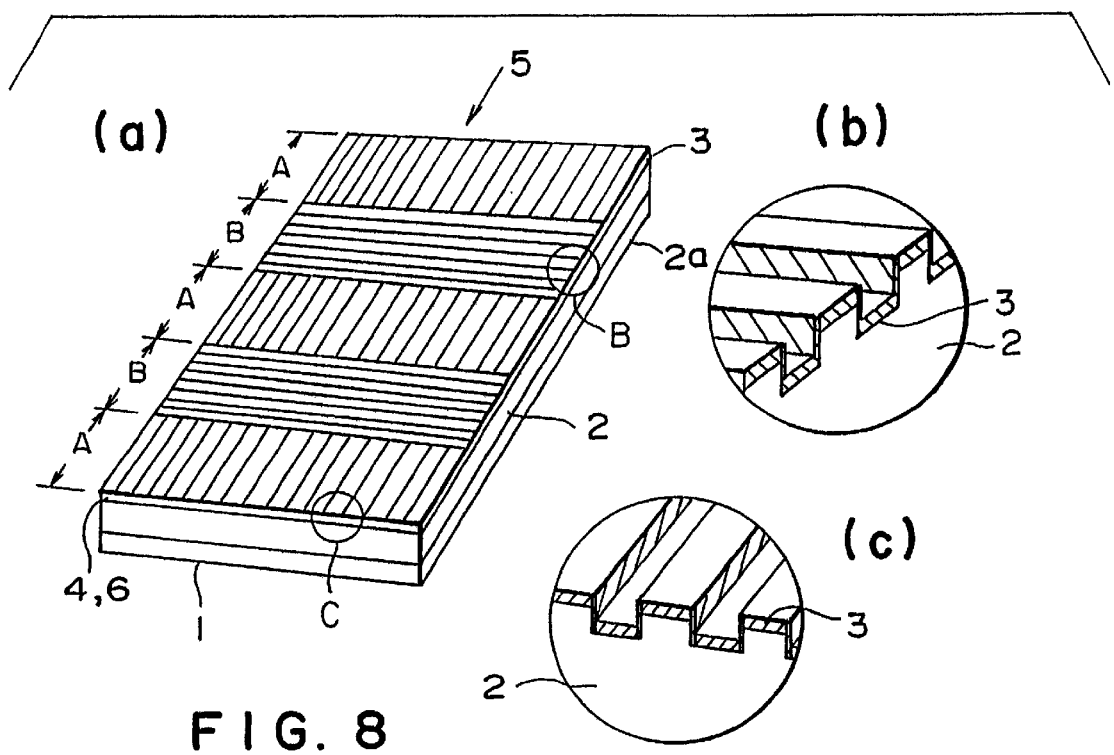
FIG. 8 is a typical view of an information recording medium in Example 3.

Referring to FIGS. 8(*a*), 8(*b*) and 8(*c*), an information recording medium 1 in Example 3 has a resin layer 2 having a surface having a holographic region 6 provided with a ridge-furrow structure 4, and a 0.2 μm thick iron ferromagnetic thin film 3 formed on the resin layer 2. The ridge-furrow structure 4 includes first holographic sections A having ridges and furrows and second holographic sections B having ridges and furrows perpendicular to those of the first holographic sections A. FIG. 8(*b*) is an enlarged view of a part B in FIG. 8(*a*) and FIG. 8(*c*) is an enlarged view of a part C in FIG. 8(*a*).

The width and the height of the ridges of the ridge-furrow structure 4 are 1 μm and 0.4 μm, respectively, and the width of the furrows of the ridge-furrow structure 4 is 1 μm. The respective patterns of the first holographic sections A and the second holographic sections B of the ridge-furrow structure 4 assumed stripes of interference colors, respectively, specific to holograms.

Figure 9:
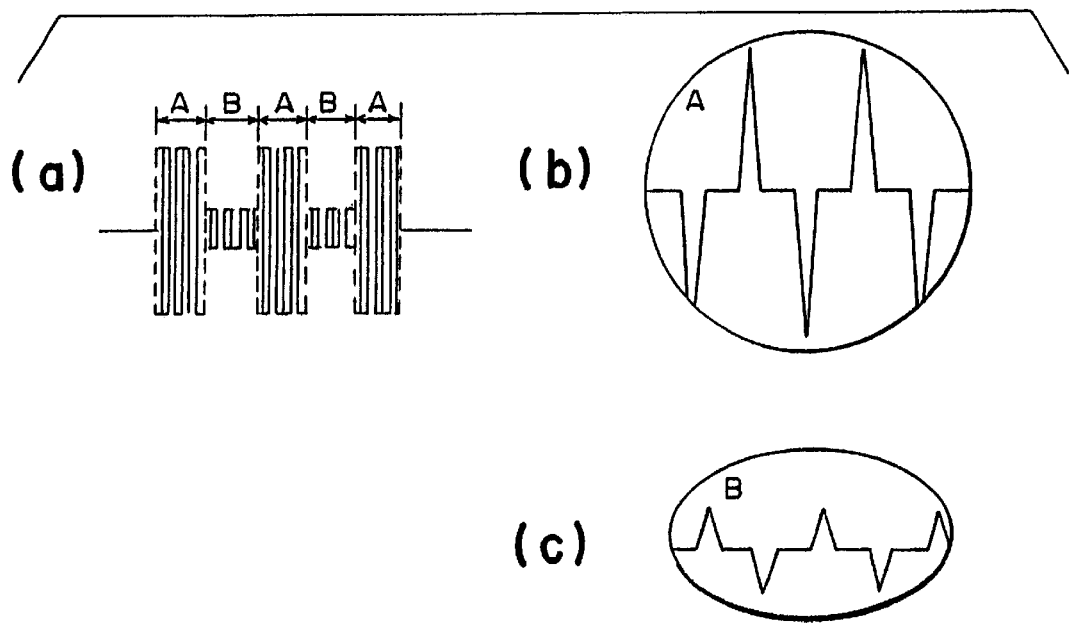
FIG. 9 is a diagram of a magnetic signal provided by the information recording medium in Example 3.

The information recording medium 1 was scanned by the information reader shown in FIG. 2 and a magnetic signal as shown in FIG. 9(*a*) read from the information recording medium 1 was recorded. FIGS. 9(*b*) and 9(*c*) are enlarged views of parts of the magnetic signal shown in FIG. 9(*a*), corresponding to the first holographic section A and the second holographic section B, respectively. The ridges and furrows of the first holographic sections A were parallel to the scanning direction and those of the second holographic sections B were perpendicular to the scanning direction.

The holographic patterns of the holographic sections A and B can be visually recognized or can be optically recognized by an optical reader 8*a* shown in FIG. 2, and magnetic signals corresponding to the holographic patterns can be read by the magnetic head 8.

A magnetic signal provided by the magnetic head 8 may be applied to the oscilloscope 10, and the magnetic signal and a signal provided by the optical reader 8*a* may be matched by a matching device 10*a*.

Example 4

Figure 10:
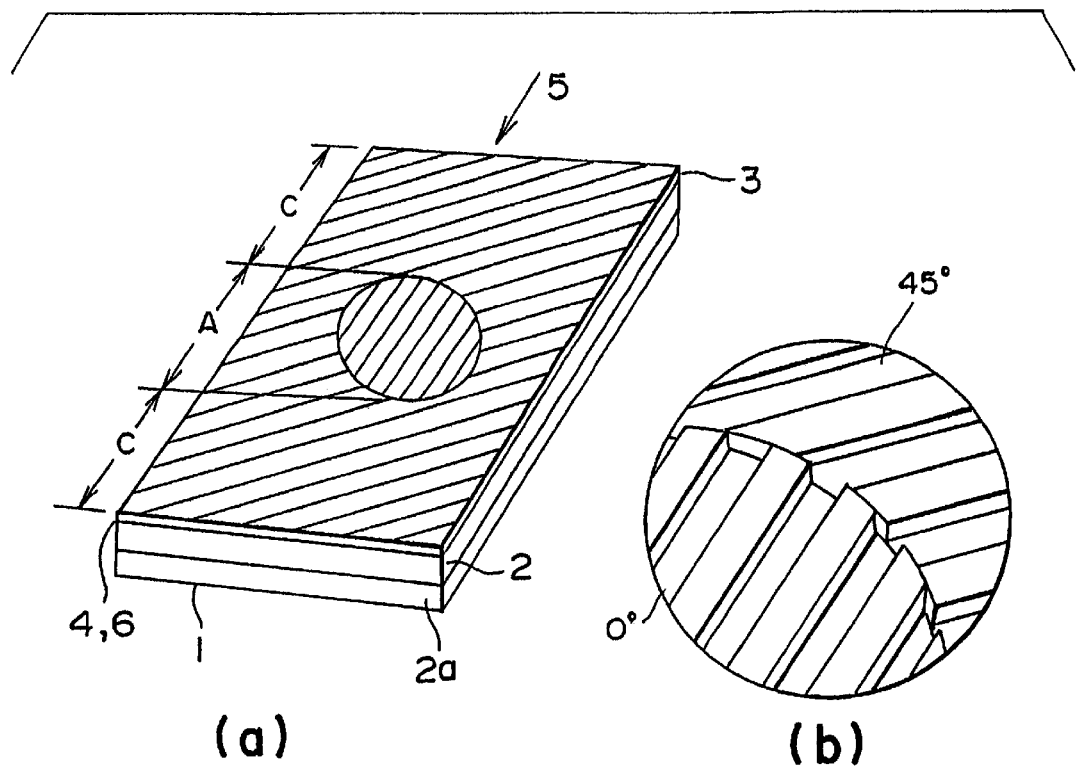
FIG. 10 is a typical view of the information recording medium in Example 4.

Referring to FIGS. 10(*a*) and 10(*b*), an information recording medium 1 in Example 4 has a resin layer 2 having a surface having a holographic region 6 provided with a ridge-furrow structure 4, and a 0.2 μm thick iron ferromagnetic thin film 3 formed on the resin layer 2. As shown in FIG. 10(*a*), the ridge-furrow structure 4 includes a first holographic section A having ridges and furrows and a second holographic section C having ridges and furrows inclined at an angle of 45° to those of the first holographic section A. FIG. 10(*b*) is an enlarged view of a part of FIG. 10(*a*).

Figure 11:
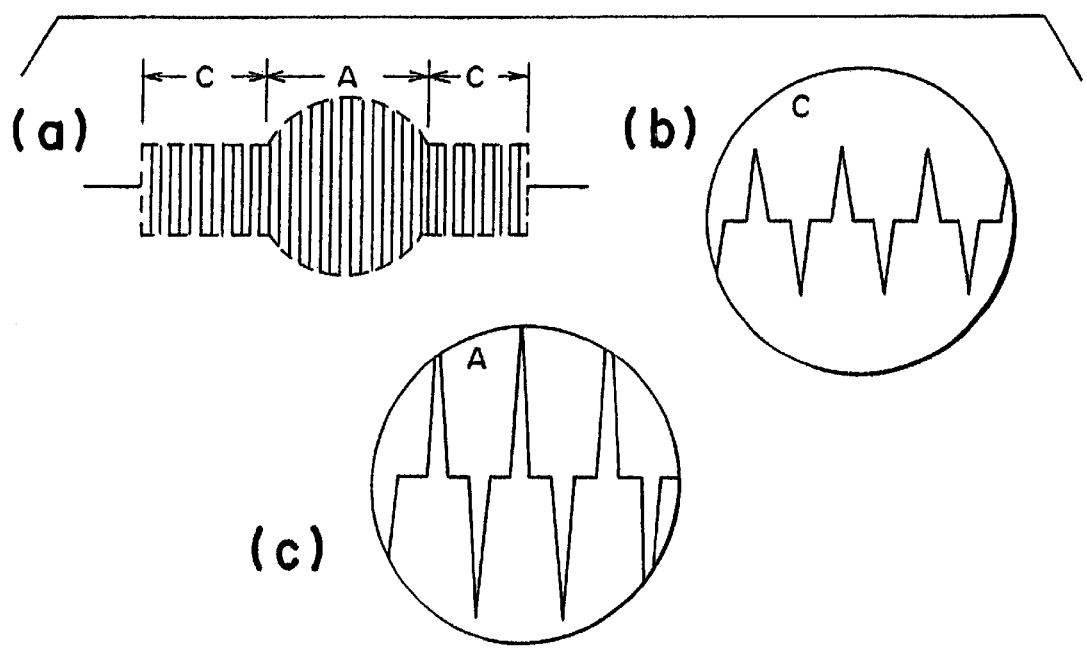
FIG. 11 is a diagram of a magnetic signal provided by the information recording medium in Example 4.

The information recording medium 1 was ac-excited by the information reader shown in FIG. 2 and the information recording medium 1 was scanned by the magnetic head 8 moved in a scanning direction indicated by the arrow 5. FIG. 11(*a*) shows a magnetic signal detected by the magnetic head 8. The scanning width of the magnetic head 8 was greater than the width of the information recording medium 1 to read the holographic pattern formed by the ridge-furrow structure 4.

The width and the height of the ridges of the ridge-furrow structure 4 are 1 μm and 0.4 μm, respectively, and the width of the furrows of the ridge-furrow structure 4 is 1 μm. The respective patterns of the first holographic section A and the second holographic section C of the ridge-furrow structure 4 assumed different interference colors, respectively.

FIG. 11(*a*) shows a magnetic signal detected by the magnetic head 8. FIG. 11(*b*) is an enlarged view of a part of the magnetic signal corresponding to the holographic section A having ridges and furrows parallel to the scanning direction indicated by the arrow 5 and FIG. 11(*c*) is a part of the magnetic signal corresponding to the holographic section C having ridges and furrows inclined at an angle of 45° to the scanning direction indicated by the arrow 5. The height of the pulses of a part of the magnetic signal corresponding to the holographic section A is greater than that of the pulses of a part of the magnetic signal corresponding to the holographic section C.

Although the detection of the magnetic characteristic of a simple holographic pattern has been described by way of example, it is easily conjectured that the information recording medium 1 of the present invention can be provided with a magnetic characteristic featured by a complicated holographic pattern that produces a three-dimensional picture and hence the ferromagnetic thin film can be discriminated from other magnetic films even if the same is not formed of a special material.

Example 5

An information recording medium 1 in Example 5 has a base sheet 2*a*, a resin layer 2 having a surface having a holographic region 6 provided with a ridge-furrow structure 4 and formed on the base sheet 2*a*, and a 0.2 μm thick iron ferromagnetic thin film 3 formed on the resin layer 2. The holographic region 6 has a first holographic section in which the ridges and furrows of the ridge-furrow structure 4 are inclined at an angle of 45° to a scanning direction (direction of magnetic flux) indicated by the arrow 5 and a second holographic section of a holographic pattern of the letter A in which the ridges and furrows are parallel to the scanning direction (direction of magnetic flux) indicated by the arrow 5.

For each of the first and second holographic sections, the width and the height of the ridges of the ridge-furrow structure 4 are 1 μm and 0.4 μm, respectively, and the width of the furrows of the ridge-furrow structure 4 is 1 μm. The respective patterns of the first holographic section and the second holographic section of the letter A assume different interference colors, because of the interference of the holographic sections.

Figure 13:
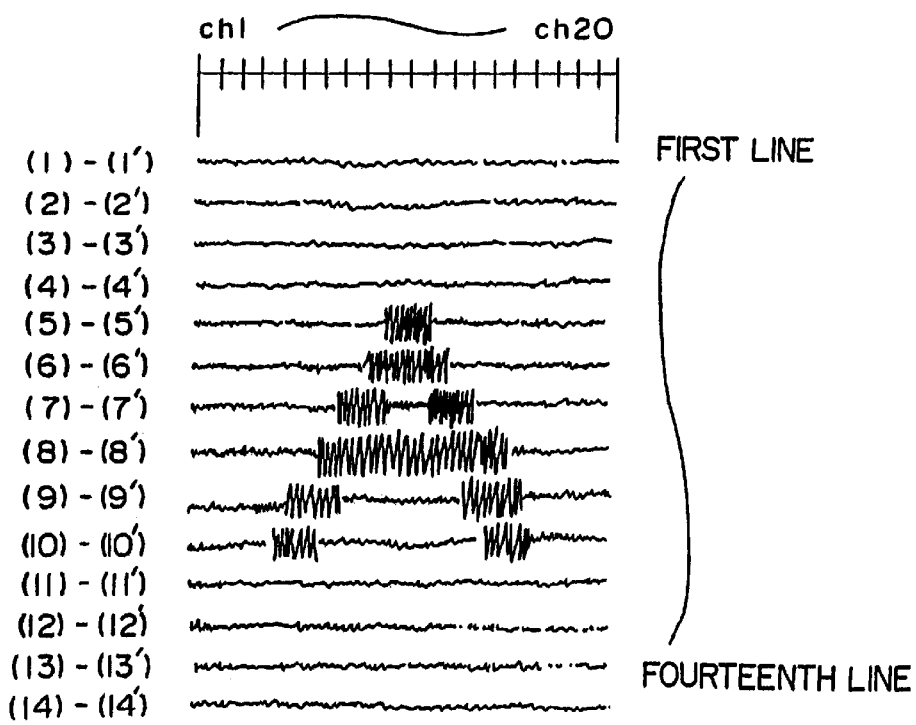
FIG. 13 is a diagram of magnetic signals provided by the information recording medium in Example 5.

The information reader shown in FIG. 2 is provided with twenty magnetic heads 8 corresponding to twenty divisions $CH_1$ to $CH_{20}$ of a scanning range. The width of each of the divisions $CH_1$ to $CH_{20}$ is far smaller than the width of the letter A. The magnetic heads 8 are arranged side by side along the width of the information recording medium 1. The information recording medium 1 is moved intermittently stopping at positions corresponding to lines (1)—(1) to (14)—(14) or continuously in the scanning direction. Pulse signals corresponding to the letter A as shown in FIG. 13 are obtained by successively selecting the magnetic heads 8 corresponding to the divisions $CH_1$ to $CH_{20}$ successively by a switching circuit, not shown, every time the magnetic heads 8 are stopped during a scanning operation, in which the magnetic heads 8 are moved intermittently. The magnetic heads 8 corresponding to the first holographic section provide pulses of a low pulse height, and those corresponding to the second holographic section in which the ridges and furrows of the ridge-furrow structure 4 extend in parallel to the scanning direction indicated by the arrow 5 provide pulses of a high pulse height.

The information recording medium 1 may be scanned with a single magnetic head 8 having a scanning width greater than the width of the information recording medium 1. The information recording medium 1 may be moved continuously at a low speed, such as a speed of about 1/10 of the foregoing scanning speed. The information recording medium 1 may be moved relative to the magnetic head 8 or the magnetic head 8 may be moved relative to the information recording medium 1 for feeding by any suitable known feed mechanism, not shown in FIG. 2.

The holographic pattern of the letter A can be visually recognized or can be optically recognized by the optical reader 8a shown in FIG. 2, and magnetic signals corresponding to the holographic pattern can be read by the magnetic head 8.

Thus, the information recording medium 1 includes the base sheet 2a, the resin layer 2 having the surface having the holographic region 6 provided with the ridge-furrow structure 4 formed so as to form the holographic pattern of the letter A, and formed on the base sheet 2a, and the ferromagnetic thin film 3 formed on the resin layer 2. The ferromagnetic thin film 3 of the information recording medium 1 has a magnetic characteristic featured by the holographic pattern as control information for preventing counterfeiting.

The information reader for reading information provided by the information recording medium 1 comprises: the ac power supply 12, the excitation coil 13, the magnetic head 8, the feed mechanism 5a for moving the information recording medium 1 relative to the magnetic head 8 or moving the magnetic head relative to the information recording medium 1 continuously or intermittently in a feed direction perpendicular to the scanning direction at a feed speed far lower than the scanning speed, and the oscilloscope 10 for displaying signals provided by the magnetic head 8.

The information reader may be provided with a pattern storage device 20a for temporarily storing signals obtained by scanning the holographic pattern formed in the holographic region 6 by the magnetic head 8 in synchronism with the scanning operation of the magnetic head 8 and the feed operation of the feed mechanism 5a, a reference pattern storage device 20b for storing signals provided by the magnetic head 8 when the magnetic head scans a reference pattern as a reference pattern, and a comparing device 20c that compares the signals stored in the pattern storage device 20a and the signal stored in the reference pattern storage device 20c.

Comparative Example 1

Referring to FIG. 14, an information recording medium in Comparative example 1 has a base sheet 2a, a resin layer 2 not provided with any diffraction grating and formed on the base sheet 2a, and a 0.2 μm thick iron ferromagnetic thin film 3 formed on the resin layer 2. The magnetic characteristic of the information recording medium was examined. The information recording medium was scanned by the same scanning method as that which scanned the information recording medium in Example 1. FIGS. 15(a) and 15(b) show a magnetic signal obtained by scanning the information recording medium. The magnetic signal is monotonous and apparently different from that obtained by scanning the holographic region 6 of the information recording medium of the present invention.

FIGS. 15(a) and 15(b) show a prepaid card 14 provided with an information recording medium 1 of the present invention and a thin, rectangular high-value-added article 15 of a plastic material or paper provided with an information recording medium 1 of the present invention, respectively. The information recording mediums 1 are attached to the prepaid card 14 and the high-added-value article 15 by bonding or transferring.

As apparent from the foregoing description, the information recording medium having the holographic region and the ferromagnetic thin film in combination ensures high security. A magnetic signal provided by the ferromagnetic thin film and representing the holographic pattern formed in the holographic region is an effective means for verifying authenticity. The information recording medium enables both visual pattern recognition and optical pattern recognition using an optical instrument. When necessary, an additional magnetic signal representing a hologram may be provided.

Second Embodiment

An information recording medium of the present invention as a counterfeit preventing thread has a base sheet, a resin layer having a surface provided with a diffraction grating or a holographic pattern, and a ferromagnetic thin film deposited on the surface of the resin layer by a vapor-phase deposition process, such as a sputtering process, or a reflective layer of aluminum or the like having the same reflecting effect as that of a brilliant thread. Combination of the brilliance and three-dimensional display effect specific to the diffraction grating or the holographic pattern, and the magnetic characteristic of the ferromagnetic thin film provides a composite effect that cannot be exercised by an ordinary brilliant thread or an ordinary magnetic thread and enhances difficulty in counterfeiting and dishonest alteration.

Forming the diffraction grating or the holographic pattern in a special pattern to complicate the magnetic characteristic of the ferromagnetic thin film can further enhance difficulty in counterfeiting and dishonest alteration.

Referring to FIG. 17 showing an information recording medium 110, i.e., a counterfeiting preventing thread, in a second embodiment according to the present invention, the information recording medium 110 has a base sheet 111, such as a resin film, a resin layer 112 formed on the base sheet 111 and having surface provided with a holographic region 106 in which a ridge-furrow structure 113, such as a diffraction grating or a holographic pattern, is formed, and an iron ferromagnetic thin film 115 formed on the surface provided with the holographic region 106 of the resin layer 112. In FIG. 17, the arrows A and B indicate direction of magnetic fields. The magnetic characteristic of the information recording medium 110 is dependent on the direction of a magnetic field applied to the information recording medium 110 by a magnetic head.

The ferromagnetic thin film 115 is formed so as to conform to the shape of the ridge-furrow structure 113 consisting of minute ridges and furrows and the ferromagnetic thin film 115 is magnetically anisotropic.

The pattern of the ridge-furrow structure 113 is a combination of different patterns to provide the ferromagnetic thin film 115 with a special magnetic characteristic, which can be used as identification information.

A reflective layer 114 may be formed between the resin layer 112 and the ferromagnetic thin film 115 to facilitate the visual recognition of the holographic pattern and to enhance brilliance. An adhesive layer 116b is formed on the front surface, i.e., an upper surface as viewed in FIG. 17, of the ferromagnetic thin film 115 and an adhesive layer 116a is formed on a back surface of the base sheet 111 opposite the surface of the same on which the resin layer 112 is formed. When the information recording medium 110 is embedded in a counterfeiting preventing paper sheet, the adhesive layers 116a and 116b enhance the adhesion between the information recording medium 110 and the counterfeiting preventing paper sheet.

The components of the information recording medium 110 will be specifically described.

The base sheet 111 is a water-resistant, heat-resistant resin film. Possible materials for forming the base sheet 111 are polyethylene terephthalate (PET) resins, polyester resins, polyamide resins, polyimide resins, polycarbonate resins, polystyrene resins, polypropylene resins, polysulfone resins, polyphenylene sulfide resins, cellulose resins and the like. The thickness of the base sheet 111 is in the range of about q to about 300 μm, preferably, in the range of 5 to 50 μm.

The resin layer 112 forming the ridge-furrow structure 113 may be formed of a synthetic resin. Possible synthetic resins for forming the resin layer 112 are thermoplastic synthetic resins including polyvinyl chloride resins, acrylic resins, such as polymethyl methacrylate resins, polycarbonate resins and polystyrene resins, and thermosetting synthetic resins including unsaturated polyester resins, melamine resins, epoxy resins, polyester (meth)acrylate resins (in this specification, the term, (meth)acrylate signifies both acrylate and methacrylate),urethane (meth)acrylate resins, epoxy (meth)acrylate resins, polyether (meth) acrylate, polyol (meth)acrylate resins, melamine (meth) acrylate resins and triazine (meth)acrylate resins. A mixture of one of the thermoplastic synthetic resins and one of the thermosetting synthetic resins may be used for forming the resin layer 112.

Possible resins for forming the resin layer 112 are those suitable for forming minute ridges and furrows by embossing, capable of hardening after embossing and having high durability, such as ultraviolet-curable resins, thermosetting resins, electron-beam-curable resins and self-curable reactive resins. In the present invention, ultraviolet-curable resins and electron-beam-curable resins are preferable. Possible resins for forming the resin layer 112 are, for example, monomers having radical, polymerizable unsaturated groups, including methyl (meth)acrylate resins, ethyl (meth)acrylate resins, propyl (meth)acrylate resins, butyl (meth)acrylate resins, isobutyl (meth)acrylate resins, t-butyl (meth)acry-late resins, isoamyl (meth)acrylate resins, cyclohexyl (meth)acrylate resins, 2-ethylhexyl (meth) acrylate resins, ethylene glycol di(meth)acrylate resins, polyethylene glycol di(meth)acrylate resins, hexanediol (meth)acrylate resins, trimethylolpropane tri(meth)acrylate resins, trimethylolpropane di(meth)acrylate resins, pentaerythritol tetra-(meth)acrylate resins, pentaerythritol tri (meth)acrylate resins, dipenta-erythritol hexa(meth)acrylate resins, ethylene glycol glycidyl ether di(meth)acrylate resins, polyethylene glycol (meth)acrylate resins, propylene glycol diglycidyl ether (meth) acrylate resins, polypropylene glycol diglycidyl ether di(meth)acrylate resins, sorbitol tetraglycidyl ether tetra(meth)acrylate resins.

Thermoformable, ultraviolet-curable or electron-beamcurable resins may be those prepared by introducing radical polymerizable unsaturated groups into polymers prepared through the polymerization or copolymerization of the following compounds (1) to (8) by the following methods (a) to (d).

(1) Monomers having hydroxyl groups

N-methylol (meth)acrylamide resins, 2-hydroxyethyl (meth)acrylate resins, 2-hydroxypropyl (meth)acrylate resins, 2-hydroxybutyl (meth)acrylate resins, 2-hydroxy-3-phenoxypropyl (meth)acrylate resins and the like (2) Monomers having carboxyl groups (Meth)acrylate, (meth)acryloyl oxyethyl monosuccinate and the like (3) Monomers having epoxy groups Glycidyl (meth)acrylate and the like (4) Monomers having aziridinyl groups 2-Aziridinylethyl (meth)acrylate, 2-aziridinyl aryl propinate and the like (5) Monomers having amino groups (Meth)acryl amide, diacetone (meth)acrylamide, dimethyl aminoethyl (meth)acrylate, diethyl aminoethyl (meth) acrylate and the like (6) Monomers having sulfonic groups 2-(Meth)acrylamide-2-methyl propane sulfonate and the like (7) Monomers having isocyanate groups Adduct prepared by adding diisocyanate, such as an adduct prepared by adding 1 part by mol 2,4-toluene diisocyanate and 1 part by mol 2-hydroxyethyl (meth)acrylate, and a radical polymerizable monomer having active hydrogen (8) Copolymers of the foregoing compounds and the following monomers copolymerizable with the foregoing compounds, for the adjustment of the glass transition points of the foregoing polymers or the adjustment of the physical properties of films Methyl (meth)acrylate, ethyl (meth)acrylate, propyl (meth)acrylate, butyl (meth)acrylate, isobutyl (meth) acrylate,t-butyl (meth)acrylate, isoamyl (meth)acrylate, cyclohexyl (meth)acrylate, 2-ethylhexyl (meth)acrylate and the like.

The foregoing polymers are made to interact by the following methods (a) to (d) for radical polymerizable unsaturated group introduction to prepare ultraviolet curable or electron-beam-curable resins.

(a) A monomer having carboxyl groups, such as (meth) acrylate or the like, is subjected to a condensation reaction for a polymer or copolymer of a monomer having hydroxyl groups or a copolymer.

(b) The aforesaid monomer having hydroxyl groups is subjected to condensation reaction for a polymer or copolymer of a monomer having carboxyl groups or sulfone groups.

(c) The aforesaid monomer having hydroxyl groups or the monomer having carboxyl groups is subjected to an addition reaction for a polymer or a copolymer of a monomer having epoxy groups, isocyanate groups or aziridinyl groups.

(d) An adduct of one part by mol of monomer having epoxy groups, a monomer having aziridinyl groups or a diisocyanate compound and 1 part by mol of acrylate having hydroxyl groups may be subjected to an addition reaction for a polymer or a copolymer of a monomer having hydroxyl or carboxyl groups.

A mixture of one of the aforesaid monomer and aforesaid thermoformable ultraviolet-curable or electron-beam-curable resin may be used.

The aforesaid resins can be satisfactorily curable by irradiation with electron beams. When ultraviolet curing is used, a substance that produces radicals when irradiated with ultraviolet rays, such as benzoin ether, such as benzoquinone, benzoin or benzoin methyl ether, or a halogenated acetophenone, may be used as a sensitizer.

The resin layer may be colored. It is preferable to color the resin layer with a dye that does not fade when irradiated with ultraviolet rays or electron beams. Concretely, possible dyes are 1-2 type azo metal complex dyes, 1-1 type azo metal complex dyes and metal phthalocyanine dyes.

The resin layer 112 formed of the aforesaid synthetic resin and forming a colored or a transparent and colorless diffraction grating or a holographic pattern is formed by a coating method, such as a gravure coating method, a knife coating method, roll coating method or a die coating method, in a thickness in the range of 0.1 to 100 $\mu$m, desirably, in the range of 0.5 to 50 $\mu$m.

The reflecting layer (or a transparent reflecting layer) 114 gives the ridge-furrow structure 113 reflectivity, which enhances the brilliance of a holographic picture or the like. A transparent reflecting layer is transparent and reflective and is a continuous thin film of a material having a refractive index different from that of the material forming the resin layer 112 or a thin film having a thickness of 1000 angstrom or below and a high refractive index, such as a thin film of titanium oxide or zinc sulfide.

The ridge-furrow structure 113 forming a diffraction grating has furrows of a width in the range of 0.4 to 5.0 $\mu$m and a depth in the range of 0.1 to 1.0 $\mu$m. The resin layer 112 provided with the diffraction grating diffracts incident light at a specific angle of diffraction and assumes color subject to change according to the direction of observation. When the interval d between the ridges of the diffraction grating is fixed, the angle $\phi$ of diffraction is dependent on the wavelength of light that falls on the diffraction grating. When the wavelength of light that falls on the diffraction grating is fixed, the angle $\phi$ of diffraction is dependent on the interval d of the ridges of the diffraction grating. Such a relation is expressed by Expression (1).

$$\lambda = d(\sin \omega + \sin \phi) \quad (1)$$

where $\lambda$ is the wavelength of light, d is the interval between the ridges of the diffraction grating, $\omega$ is incident angle and $\phi$ is angle of diffraction.

The diffraction grating can be formed by mechanical machining or by a photolithographic etching process that forms a resist pattern by patterning a resist film formed on the resin layer by an electron beam lithography system and etches the resin layer by using the resist pattern. A duplicate embossing plate is formed by copying an original plate provided with the diffraction grating, and the duplicate embossing plate is used for embossing the diffraction grating on the resin layer.

The holographic pattern of the ridge-furrow structure 113 is capable of forming a two- or three-dimensional image. The holographic pattern may be a relief hologram having a ridge-furrow pattern representing the distribution of the light intensity of interference fringes formed by the interference between an object wave and a reference wave. Other possible holographic patterns include laser-reproducible holograms, such as Fresnel holograms, Fraunhofer holograms, lensless Fourier transform holograms and image holograms, white-light-reproducible holograms, such as rainbow holograms, and holograms based on those principles, such as color holograms, computer holograms, hologram displays, multiplex holograms and holographic stereograms. The pitches of interference fringes and the depth of the furrows of those holograms are the similar to those mentioned above.

The material of the ferromagnetic thin film 115 may be crystalline or amorphous. The material contains a magnetic material containing one or some of iron (Fe), cobalt (Co) and nickel (Ni) as principal components, andsome of metals including boron (B), carbon (C), magnesium (Mg), aluminum (Al), silicon (Si), phosphor (P), sulfur (S), titanium (Ti), vanadium (V), chromium (Cr), manganese (Mn), Copper (Cu), zinc (Zn), yttrium (Y), zirconium (Zr), niobium (Nb), molybdenum (Mo), palladium (Pd), silver (Ag), indium (In), tin (Sn), tantalum (Ta), tungsten (W), Iridium (Ir), platinum (Pt), gold (Au) and lead (Pb), or nonmetallic elements as additives.

The ferromagnetic thin film 115 is formed on the diffraction grating or the holographic pattern by a vacuum deposition process using a material containing an alloy of ion, cobalt and/or nickel, as a principal component, and the additives or a mixture of those substances as a target or a source material, such as a vacuum deposition process or an ion plating process.

A suitable thickness of the ferromagnetic thin film 115 is in the range of 500 to 5000 angstrom (0.05 to 0.5 $\mu$m). If the thickness of the ferromagnetic thin film 115 is less than 500 angstrom, the amount of the magnetic material is excessively small, the saturation magnetic flux is excessively small and the intensity of the magnetic signal is excessively low. The thickness of the ferromagnetic thin film 115 must be 500 angstrom or above to obtain a magnetic signal sufficient for authenticity verification. The upper limit of the thickness of the ferromagnetic thin film 115 is 5000 angstrom to discriminate the ferromagnetic thin film 115 exactly from magnetic films formed by other method and having a thickness of 1 $\mu$m or above. Thus it is preferable not to form the ferromagnetic thin film lit in a thickness greater than 5000 angstrom. If the ferromagnetic thin film 115 is formed in a thickness greater than 5000 angstrom, the ferromagnetic thin film 115 tends to curl due to stress that will be induced therein, which will affect the characteristic of the information recording medium 110 or an information recording medium transfer foil 210 (FIG. 25), which will be described later, and cracks may develop in the ferromagnetic thin film 115.

IN view of the productivity of an apparatus for forming the ferromagnetic thin film 115 and the stability of the magnetic signal, a preferable thickness of the ferromagnetic thin film 115 is in the range of 1500 to 3000 angstrom (0.15 to 0.3 $\mu$m).

The ferromagnetic thin film 115 has a special coercive force Hc and a special saturation magnetic flux density Bm. Since the ferromagnetic thin film 115 has unique magnetic characteristics represented by the relation between the intensity of a magnetic field applied thereto and magnetic flux density, indicated by a nonlinear B-H characteristic curve (magnetic hysteresis curve), the ferromagnetic thin film 115 can be exactly discriminated from general magnetic films.

FIGS. 18(a) and 18(b) are graphs showing magnetic hysteresis curves representing the magnetic characteristics of the ferromagnetic thin film 115. As shown in FIG. 18(a), the B-H hysteresis curve representing the magnetization of a part of the ferromagnetic thin film 115 on a smooth surface has a large rectangularity ratio (0.8 to 1.0) and the coercive force Hc of the part is small. As shown in FIG. 18(b), the B-H hysteresis curve representing the magnetization of a part of the ferromagnetic thin film 115 on an surface has a small rectangularity ratio (0.5 or below) and the part has a large coercive force Hc and a small saturation flux density Bm.

Changes in the rectangularity ratio are caused by the direction of a magnetic field applied to a minute ridge-furrow pattern. For example, when a magnetic field is applied in a direction indicated by the arrow A (FIG. 17) parallel to the minute ridges, the upper surfaces, the side surfaces and the bottom surfaces of the minute ridges and furrows can be regarded as elongate rectangular surfaces, and the ridges and the furrows can be regarded as magnetic bodies having longitudinal spontaneous magnetization. Therefore, when a magnetic field is applied to the ferromagnetic thin film in the direction of the arrow A (FIG. 17), the ferromagnetic thin film 115 exhibits a B-H characteristic of a large rectangularity ratio and is saturated by a low magnetic field. When a magnetic field is applied to the information recording medium 110 in a direction indicated by the arrow B (FIG. 17), the direction is perpendicular to the easy direction of magnetization (direction of spontaneous magnetization), a high magnetic field must be applied to the ferromagnetic thin film 115 to saturate the same, and the ferromagnetic thin film 115 shows a B-H characteristic having a small rectangularity ratio. The rectangularity ratio is dependent on the angle of the direction of the magnetic field applied to the ferromagnetic thin film 115 to the direction of the spontaneous magnetization as shown in FIG. 19. Theoretically, the rectangularity ratio is zero when the angle between the direction of the magnetic field and the direction of spontaneous magnetization is 90°. The rectangularity ratio Rsq can be expressed by Expression (2).

$$Rsq=Br/Bm \qquad (2)$$

where Br is remanent magnetic flux density and Bm is saturation magnetic flux density.

A reflecting layer 114 of a nonmagnetic metal film may be formed between the ferromagnetic thin film 11 and the resin layer 112 provided with the ridge-furrow structure 113 forming the diffraction grating or the holographic pattern. The reflecting layer 114 reflects light and the lustrous color of the nonmagnetic metal forming the reflecting layer 114 can be seen without being affected by the color of the ferromagnetic thin film 115. The information recording medium 110 provides a counterfeiting preventing thread that is similar in appearance to the ridge-furrow structure 113 forming the diffraction grating or the holographic pattern. The reflecting layer 114 is formed of reflective nonmagnetic meal, such as gold, silver, aluminum chromium or nickel. In view of cost and technical problems, aluminum is a preferable metal for forming the reflecting layer 114. The thickness of the reflecting layer 114 is in the range of about 100 to about 2000 angstrom, preferable, in the range of about 200 to about 100 angstrom. The reflecting layer 114 is formed of an alloy, such as a bronze, a brass or a white copper, for coloring or adjusting the reflectivity of the reflecting layer 114. The reflecting layer 114 can be a transparent or semitransparent deposited film when a metal compound, such as an oxide of a metal, an oxide or sulfide of a metal or an alloy. Preferable metal compounds are zinc sulfide (ZnS), titanium oxide ($TiO_2$), magnesium fluoride ($MgF_2$), barium titanate ($BaTiO_2$) and the like.

FIGS. 20(a), 20(b) and 20(c) show examples of diffraction gratings or holographic patterns of ridge-furrow structures 113. The ridge-furrow structures 113 have ridges and furrows extending at different angles to the scanning direction of the magnetic head 8 (FIG. 2) or the length of the information recording medium 110, respectively, and the ridge-furrow structures 113 are arranged in different combinations, respectively, to provide ferromagnetic thin films formed thereon with different magnetic characteristics, respectively.

The diffraction grating or the holographic pattern shown in FIG. 20(a) is formed by alternately arranging the ridge-furrow structures 113 and smooth sections 113n not provided with any ridge-furrow structure alternately along the length of the information recording medium 110. When parts of the ferromagnetic thin film 115 corresponding to the smooth sections 113n and parts of the ferromagnetic thin film 115 corresponding to the ridge-furrow structures 113 provide signals "0" and "1" respectively, the ferromagnetic thin film 115 provides a series of signals 0, 1, 0, 1 . . .

The diffraction grating or the holographic pattern shown in FIG. 20(b) is formed by alternately arranging a combination of a first ridge-furrow structure having ridges and furrows extending in parallel to the length of the information recording medium 110 and a second ridge-furrow structure having ridges and furrows extending perpendicularly to the length of the information recording medium 110, and a smooth sections not provided with any ridge-furrow structure along the length of the information recording medium 110. When parts of the ferromagnetic thin film 115 corresponding to the smooth sections, parts of the ferromagnetic thin film 115 corresponding to the first ridge-furrow structures, and the parts of the ferromagnetic thin film 115 corresponding to the second ridge-furrow structures provide signals "0", "1" and "2", the ferromagnetic thin film 115 provides a series of signals 0, 1, 2, 0, 1, 2, . . .

The diffraction grating or the holographic pattern shown in FIG. 20(c) is formed by alternately arranging a combination of a first ridge-furrow structure 113 having ridges and furrows extending in parallel to the length of the information recording medium 110, a second ridge-furrow structure 113 having ridges and furrows extending perpendicularly to the length of the information recording medium 110 and a third ridge-furrow structure 113 having ridges and furrows extending at an angle of 45° to the length of the information recording medium 110, and a smooth sections 113n not provided with any ridge-furrow structure along the length of the information recording medium 110. When parts of the ferromagnetic thin film 115 corresponding to the smooth sections 113n, parts of the ferromagnetic thin film 115 corresponding to the first ridge-furrow structures 113, the parts of the ferromagnetic thin film 115 corresponding to the second ridge-furrow structures 113 and parts of the ferromagnetic thin film 115 corresponding to the third ridge-furrow structures 113 provide signals "0", "1", "2" and "3", the ferromagnetic thin film 115 provides a series of signals 0, 1, 2, 3, 0, 1, 2, 3, . . .

Various combinations of such signals different from the foregoing combinations of signals can be produced by various methods of arranging ridge-furrow structures respectively having ridges and furrows extended at different angles to the length of the information recording medium because the magnetic characteristic of a part of the ferromagnetic thin film corresponding to a ridge-furrow structure is dependent on the angle of the ridges and furrows of the ridge-furrow structure as shown in FIG. 19. Practically, it is possible to provide the information recording medium with any one of infinite number of combinations of signals.

When the information recording medium 110 is embedded in a sheet, the adhesive layer 116a enhances the adhesion between the information recording medium 110 and the sheet. The adhesive layer 116a may be formed of a water-soluble binder having a melting point in the range of 60 to 80° C. on the back surface of the base sheet 111. The adhesive layer 116b may be formed on the upper surface (front surface) of the ferromagnetic thin film 115. The adhesive layer 116b may be formed of a water-soluble adhesive, such as starch, casein, carboxymethyl cellulose, carboxyethyl cellulose or the like.

The adhesive layers may be formed of a hot-melt adhesive having a melting point in the range of 60 to 80° C. in a thickness of several micrometers.

A counterfeiting preventing sheet according to the present invention will be described.

A conventional counterfeiting preventing sheet provided with a thread partly exposed in windows, i.e., threaded sheet with windows, is fabricated by combining a brilliant thread with a base sheet, and has display parts (windows) in which parts of the thread are exposed and covering parts covering the thread at intervals. This threaded sheet can be manufactured by using a multicylinder papermaking machine provided with a wire cloth provided with a small protrusion of a width equal to or greater than that of the thread, placing the thread on the protrusion and supplying paper slurry onto the wire cloth. Parts of the thread not on the protrusion are immersed in the paper slurry and concealed in the threaded sheet and parts of the same on the protrusion are exposed in the lower surface of the threaded sheet.

In this threaded sheet with windows, parts of the brilliant thread are exposed at intervals and hence a metallic color cannot be reproduced when the threaded sheet is copied, which prevents counterfeiting. The end surface of the threaded sheet does not need to be examined for authenticity verification and the separation of the brilliant thread from the base sheet can be prevented.

FIGS. 21(a) and 21(b) are a plan view and a sectional view taken on line A—A in FIG. 21(a), respectively, of a first example of a counterfeiting preventing sheet according to the present invention.

Figure 21:
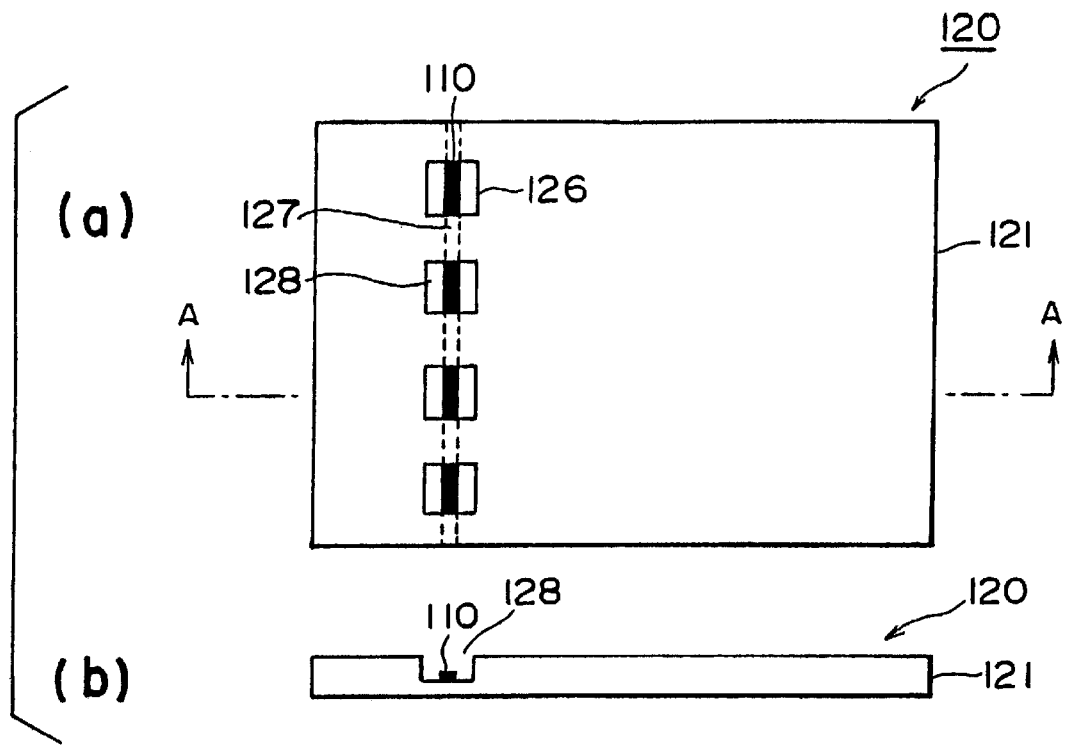
FIG. 21 is a view of a counterfeiting preventing sheet according to the present invention.

Referring to FIG. 21, a counterfeiting preventing sheet 120 in a first example has a base sheet 121 and a thread (information recording medium) 110 embedded in the base sheet 121. The base sheet 121 has plural windows 126 in which parts of the thread 110 are exposed and covering parts 127 covering parts of the thread 110 extending between the windows 126. The width of the windows 126 may be equal to that of the thread 110. In this example, the windows 126 are formed in a width greater than that of the thread 110 to form margins 128 on the opposite sides of the exposed parts of the thread 110 to absorb errors in the position of the thread 110 relative to the windows 126 when making the base sheet 121.

It is desirable that parts of the base sheet 121 corresponding to opposite end parts of the thread 110 are covering parts 127 because the thread 110 is liable to be separated from the base sheet 121 if the opposite end parts of the thread 110 are exposed. The width of the thread 110 is dependent on the purpose of the counterfeiting preventing sheet 120. Generally, the width of the thread 110 is in the range of about 0.2 to about 5 mm.

Figure 22:
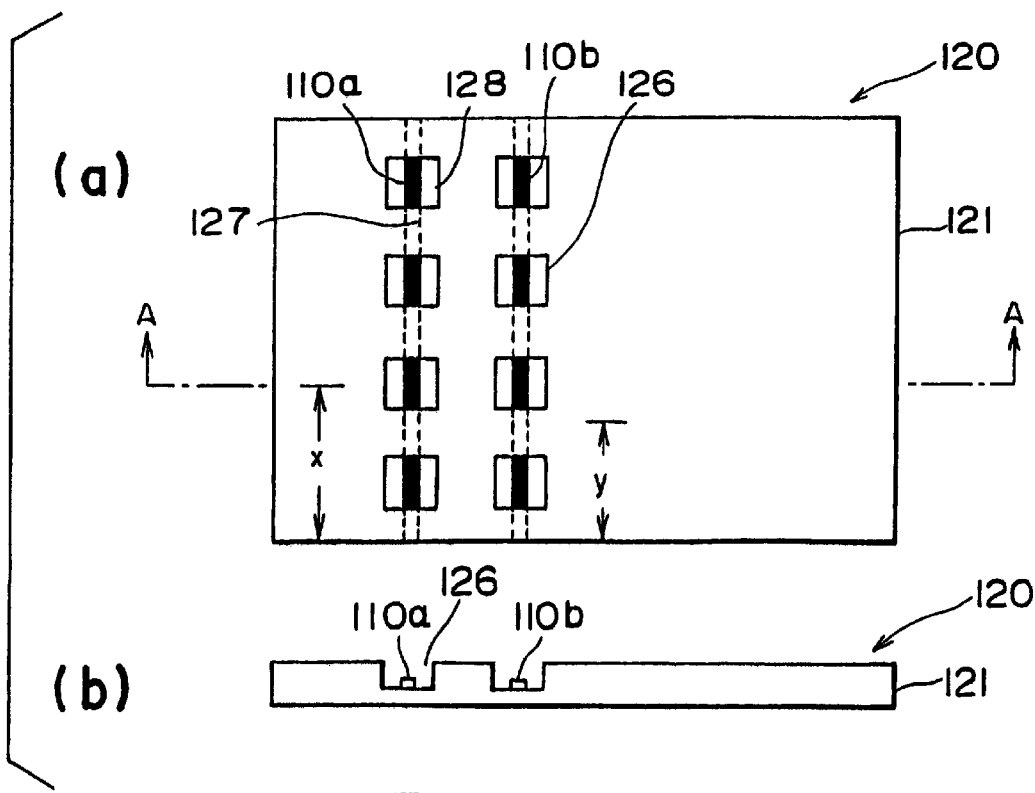
FIG. 22 is a view of another counterfeiting preventing sheet according to the present invention.

FIGS. 22(a) and 22(b) are a plan view and a sectional view taken on line A—A in FIG. 22(a), respectively, of a second example of a counterfeiting preventing sheet according to the present invention. As shown in FIG. 22, a counterfeiting preventing sheet 120 in a second example has a base sheet 121 and two threads (information recording mediums) 110a and 110b embedded in the basesheet 121. The basesheet 121 has plural windows 126 in which parts of the threads 110a and 110b are exposed and covering parts 127 covering parts of the threads 110a and 110b extending between the windows 126.

The counterfeiting preventing sheet 120 in the second example is characterized in that the positional relation between the windows 126 and the covering parts 127 for the thread 110a and that between the windows 126 and the covering parts 127 for the thread 110b are the same, and the windows 126 for the thread 110a and those for the thread 110b correspond to each other, respectively. That is, both the windows 126 respectively for the threads 110a and 110b are at a distance x from a side edge of the base sheet 121, and both the covering parts 127 respectively for the threads 110a and 110b are at a distance y from the side edge of the base sheet 121.

It is desirable that parts of the base sheet 121 corresponding to opposite end parts of the threads 110a and 110b are covering parts 127 because the threads 110a and 110b are liable to be separated from the base sheet 121 if the opposite end parts of the threads 110a and 110b are exposed. The width of the threads 110a and 110b is dependent on the purpose of the counterfeiting preventing sheet 120. Generally, the width of the thread 110 is in the range of about 0.2 to about 5 mm.

The threads 110a and 110b do not need to have the same width and may be different from each other in color tone, optical characteristics, coloring characteristics and magnetic characteristics.

When the counterfeiting preventing sheet 120, i.e., a security medium, is thus provided with the two threads 110a and 110b, a method of counterfeiting the counterfeiting preventing sheet 120 that uses counterfeit threads requires an increased cost and needs complicated steps. Thus, the counterfeiting preventing sheet provided with plural threads has an enhanced counterfeiting preventing effect.

Figure 23:
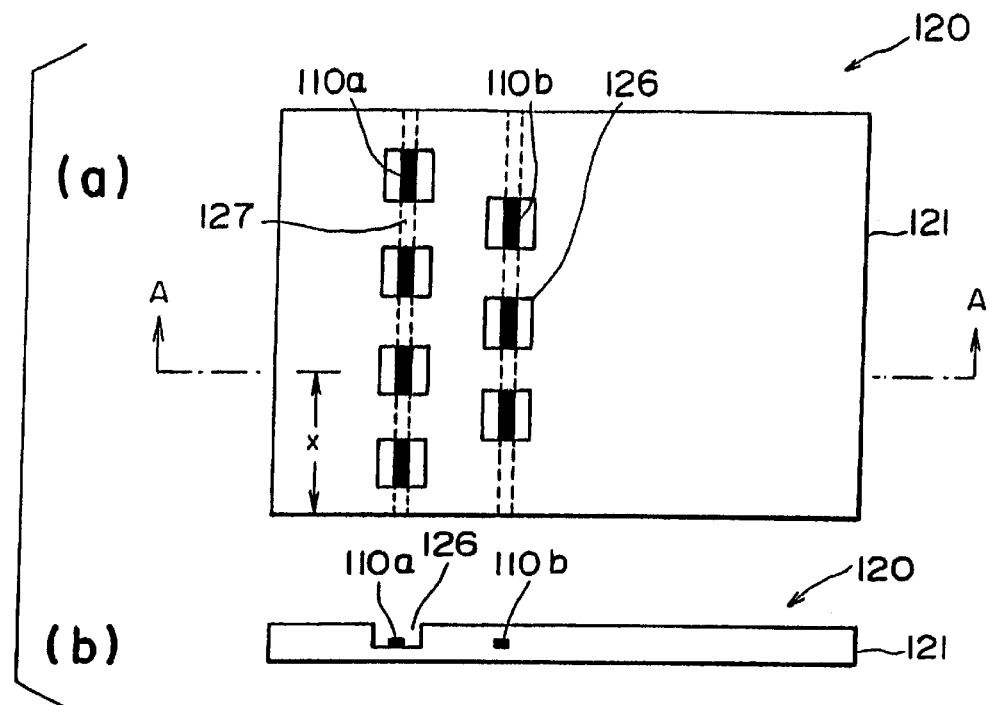
FIG. 23 is a view of a third counterfeiting preventing sheet according to the present invention.

FIGS. 23(a) and 23(b) are a plan view and a sectional view taken on line A—A in FIG. 23(a), respectively, of a third example of a counterfeiting preventing sheet according to the present invention. AS shown in FIG. 23, a counterfeiting preventing sheet 120 in a third example has a base sheet 121 and two threads (information recording mediums) 110a and 110b embedded in the base sheet 121. The base sheet 121 has plural windows 126 in which parts of the threads 110a and 110b are exposed and covering parts 127 covering parts of the threads 110a and 110b extending between the windows 126.

The counterfeiting preventing sheet 120 in the third example is characterized in that the windows 126 for the thread 110a and those for the thread 110b are staggered, and the covering parts 127 for the thread 110a and those for the thread 110b are staggered. That is, the window 126 for the thread 110a at a distance x from a side edge of the base sheet 121 corresponds to the covering part 127 for the thread 110b at the distance x from the same side edge of the basesheet 121. The counterfeiting preventing sheet 120 may be provided with plural threads more than two threads. In the counterfeiting preventing sheet 120 provided with plural threads, the windows for at least the two adjacent threads are staggered. However, it is preferable that opposite end parts of the threads 110a and 110b are covered with the covering parts 127.

When a plurality of counterfeiting preventing sheets 120 each provided with the staggered windows 126 for the threads 110a and 110b are superposed in a pile, the bulging of a part of the pile corresponding to the threads 110a and 110b can be suppressed, which facilitates printing and prevents the deformation of a roll of the sheet when handling the roll.

A method of fabricating the counterfeiting preventing sheet 120 will be described hereinafter.

Figure 24:
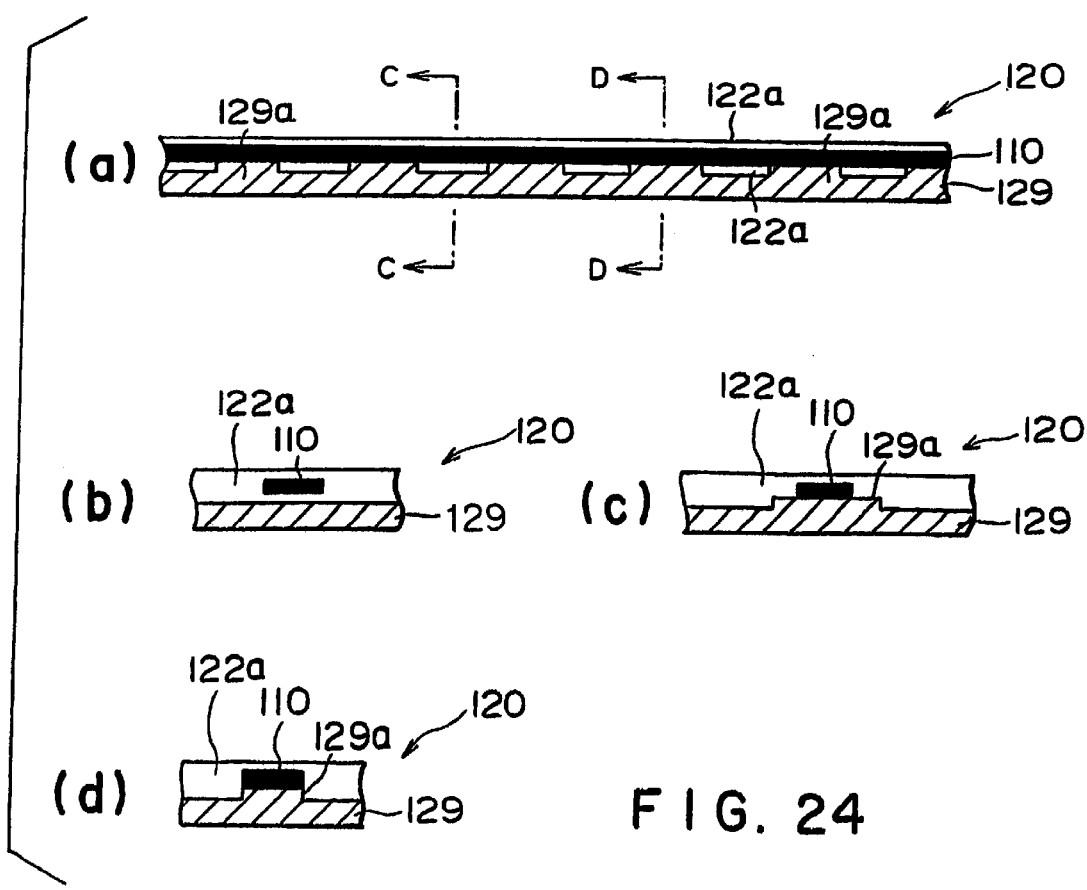
FIG. 24 is a view of assistance in explaining a method of making a threaded counterfeiting preventing sheet.

FIG. 24(a) is a sectional view of the counterfeiting preventing sheet 120 in a plane including the thread, FIG. 24(b) is a sectional view taken on line C—C perpendicular to the thread in FIG. 24(a) and FIG. 24(c) is a sectional view taken on line D—D in FIG. 24(a). Protrusions 129a of a width equal to or greater than that of the thread 110 are formed at suitable intervals on a wire cloth 129 of a papermaking machine. The thread 110 is extended on the protrusions 129a and paper slurry 122a is poured onto the wire cloth to form the base sheet 121. Consequently, parts of the thread 110 extending between the protrusions 129a are embedded in the base sheet 121, and parts of the base sheet 121 corresponding to those parts of the thread 110 form the covering part 127. Parts of the thread 110 resting on the protrusions 129a are exposed when the base sheet 121 thus formed is removed from the wire cloth of the papermaking machine, and parts of the sheet 120 corresponding to the protrusions 129a form the windows 126.

When the protrusions 129a of the wire cloth is formed in a width equal to that of the thread 110 as shown in FIG. 24(d), any margins are not formed on the opposite sides of the thread 110. When the windows 126 are formed in a width greater than that of the thread 110, margins 128 are formed on the opposite sides of the exposed parts of the thread 110. The margins 128 absorb errors in the position of the thread 110 relative to the windows 126 when making the base sheet 121 and add an aesthetic effect to the counterfeiting preventing sheet 120. A watermark 25 can be formed around the thread by a protruding pattern similar to the protrusions 29a and formed on the wire cloth.

EXAMPLES

Fabrication of Counterfeiting Preventing Thread

A 16 µm thick smooth, transparent polyethylene terephthalate film (LUMILAR S-28 commercially available from TorayCorp.) was used as a base sheet 111. A thermoformable resin layer 112, i.e., a diffraction grating forming layer, was formed of an ultraviolet-curable resin that is a solid at ordinary temperatures. An embossing plate having a surface provided with a ridge-furrow pattern for forming a diffraction grating is pressed against the resin layer 112 to form a diffraction grating in the surface of the resin layer 112, and then the resin layer 112 was irradiated with ultraviolet rays for curing. Thus, ridge-furrow structures 113 forming diffraction gratings or holographic patterns as shown in FIG. 20(b) were formed on the resin layer 112. The ridge-furrow structures 113 were formed on the resin layer 112 so that a sequential arrangement of the ridge-furrow structure 113 having ridges and furrows extending in parallel to the length of the base sheet 111, the ridge-furrow structure 113 having ridges and furrows extending in a direction perpendicular to the length of the base sheet 111 and a smooth (blank) part not provided with any ridge-furrow structure are arranged successively.

Subsequently, a 300 angstrom thick reflecting layer 114 of aluminum was deposited on the surface of the resin layer provided with the ridge-furrow structures 113 by a vacuum deposition process, and a 0.2 µm thick ferromagnetic thin film 115 of an Fe—Si alloy was formed on the reflecting layer 114 by a sputtering process.

A 1 µm thick adhesive layer of a vinyl acetate adhesive was formed on the back surface of the base sheet 111 to complete a counterfeiting preventing sheet. Then, the counterfeiting preventing sheet was slit into 2 mm wide counterfeiting preventing threads 110 of the present invention.

The reflecting layer 114 of aluminum, the ferromagnetic thin film 115 may be formed on the resin layer 112, and then the resin layer 112, the reflecting layer 114 and the ferromagnetic thin film 115 may be subjected to embossing to form the ridge-furrow structures 113.

The magnetic characteristics of the counterfeiting preventing thread 110 were measured. When a magnetic field is applied to the counterfeiting preventing thread 110 in the direction of the arrow A (FIG. 17) parallel to the ridges and furrows of the ridge-furrow structure 113, the rectangularity ratio of the magnetic hysteresis curve of the magnetism of the ferromagnetic thin film 115 was 0.9. When a magnetic field was applied to the counterfeiting preventing thread 110 in the direction of the arrow B (FIG. 17) perpendicular to the ridges and furrows of the ridge-furrow structure 113, the rectangularity ratio of the magnetic hysteresis curve of the magnetism of the ferromagnetic thin film 115 was 0.2. The same measurement can be obtained by applying a dc magnetic field to the counterfeiting preventing thread 110 by a VSM (vibrating-sample magnetometer) and by applying an ac magnetic field to the counterfeiting preventing thread 110 by a B-H analyzer.

Fabrication of Counterfeiting Preventing Sheet

A 90 kg type wood-free paper sheet provided with two counterfeiting preventing threads 110 made by the foregoing method as shown in FIG. 22 was made by a papermaking machine having a wire cloth provided with protrusions capable of forming 10 mm wide windows 126 having a length of 10 mm and covering parts 127 having a length of 110 mm. The height of the protrusions of the wire cloth was determined such that an upper part of the covering part 127 and a lower part of the same have weight per unit area of 35 g/m$^2$ and 69 g/m$^2$, respectively.

The magnetic signal provided by the counterfeiting preventing sheet 120 thus fabricated was detected by a magnetic head. Parts of the ferromagnetic thin film 115 corresponding to the smooth (blank) sections, parts of the ferromagnetic thin film 115 corresponding to the first ridge-furrow structures having ridges and furrows parallel to the length of the thread 110, and the parts of the ferromagnetic thin film 115 corresponding to the second ridge-furrow structures having ridges and furrows perpendicular to the length of the thread 110 provided signals "0", "1" and "2". Thus the counterfeiting preventing sheet 120 provides a series of signals 0, 1, 2, 0, 1, 2, . . .

The counterfeiting preventing thread of the present invention has the base sheet, the resin layer provided with the diffraction gratings or the holographic patterns, the ferromagnetic thin film formed on the resin layer and, when necessary, the reflecting layer formed between the resin layer and the ferromagnetic thin film. Therefore, the counterfeiting preventing thread of the present invention has a reflecting effect comparable with that of the conventional brilliant thread, exhibits brilliance specific to a diffraction grating or a holographic pattern, exercises a composite effect that cannot be exercised by an ordinary brilliant thread or an ordinary magnetic thread and enhances difficulty in counterfeiting and dishonest alteration.

The counterfeiting preventing sheet of the present invention formed by combining the base sheet, i.e., a support member, and the counterfeiting preventing thread is difficult to duplicate and is capable of enhancing the reliability of certificates, such as gift certificates, and securities.

Third Embodiment

An information recording medium transfer foil (magnetic information transfer foil) has a base sheet, a support member, a lubricant layer formed on the base sheet, a resin layer formed on the lubricant layer and provided with diffraction gratings or holographic patterns, a ferromagnetic thin film formed by a vacuum deposition process or a vapor-phase deposition process, such as a sputtering process, on the resin layer and, when necessary, a reflecting layer of aluminum or the like having a reflecting effect comparative with that of an ordinary brilliant foil formed between the resin layer and the ferromagnetic thin film. Combination of the brilliance and three-dimensional display effect specific to the diffraction grating or the holographic pattern, and the magnetic characteristic of the ferromagnetic thin film provides a composite effect that cannot be exercised by an ordinary brilliant transfer foil or an ordinary magnetic transfer foil and enhances difficulty in counterfeiting and dishonest alteration.

Forming the diffraction grating or the holographic pattern in a special pattern to complicate the magnetic characteristic of the ferromagnetic thin film can further enhance difficulty in counterfeiting and dishonest alteration.

An information recording medium transfer foil (magnetic information transfer foil) in a third embodiment according to the present invention will be described with reference to the accompanying drawings.

Referring to FIG. 25, an information recording medium transfer foil 210 in the third embodiment includes a base sheet 211, a lubricant layer 217 formed on the base sheet 211 and a resin layer 212 formed on the lubricant layer 217. The resin layer 212 has a surface having a holographic region 206 provided with a ridge-furrow structure 213. If the base sheet 211 is capable of retaining the resin layer 212 thereon and of being separated properly from the resin layer 212, the lubricant layer 217 may be omitted.

The ridge-furrow structure 213 forms a diffraction grating or a holographic pattern. A ferromagnetic thin film 215 of a specific material is formed on the resin layer 212. When necessary, a reflecting layer 214 is formed between the resin layer 212 and the ferromagnetic thin film 215. The ferromagnetic thin film 215 exhibits a magnetic characteristic dominated by the diffraction grating or the holographic pattern formed by the ridge-furrow structure 213. A bonding layer 218 of a heat sealable resin or an adhesive is formed on the ferromagnetic thin film 215. In FIG. 25, the bonding layer 218 is partly cutaway.

An information recording medium transfer foil in a modification of the information recording medium transfer foil in the third embodiment has plural holographic regions 206 provided with ridge-furrow structures 213, and plural blank regions 213n not provided with any ridge-furrow structure as shown in FIG. 26. The plural holographic regions 26 and the plural blank regions 213n gives the ferromagnetic thin film 215 a special magnetic characteristic.

Figure 12:
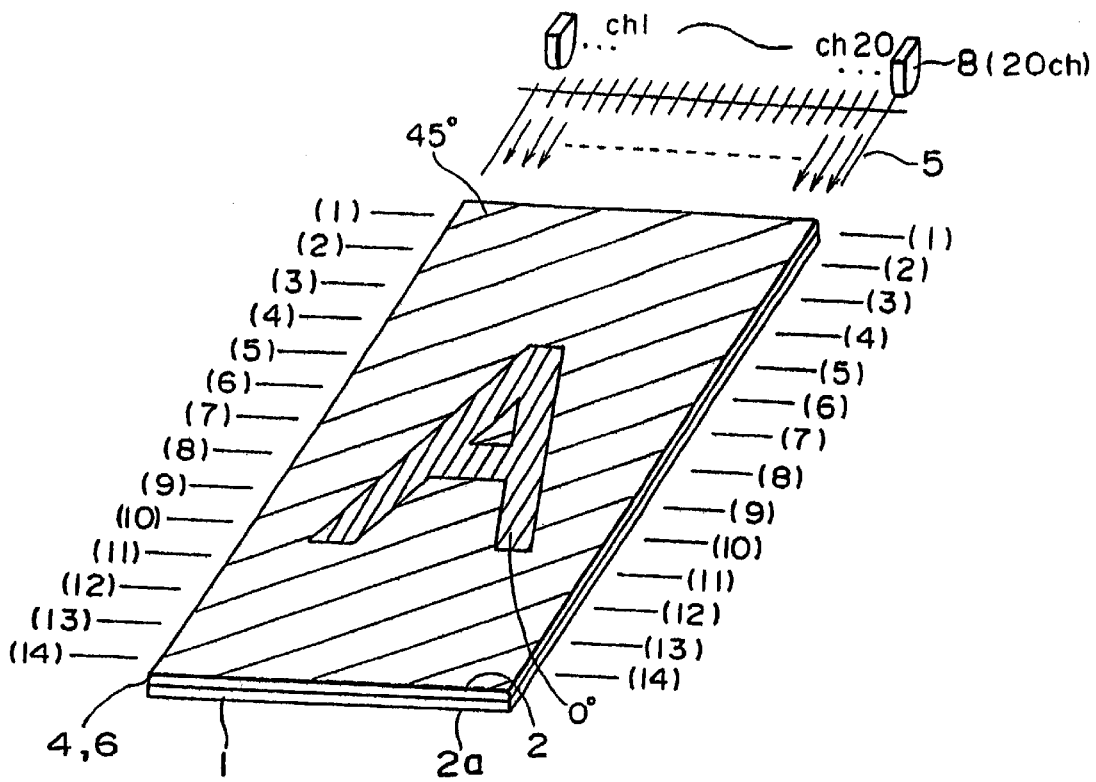
FIG. 12 is a perspective view of an information recording medium in Example 5 for assistance in explaining an information reader for reading a magnetic signal provided by the information recording medium in Example 5.

An information recording medium transfer foil in another modification of the information recording medium transfer foil in the third embodiment may have a holographic region 206 provided with a first ridge-furrow structure and a second ridge-furrow structure formed in the first ridge-furrow structure and forming a holographic pattern of a character or an image as shown in FIG. 12. The character or the image gives magnetic characteristic identifying information.

The information recording medium transfer foil is provided with a reflecting layer 214 of a nonmagnetic metal formed between the resin layer 212 and the ferromagnetic thin film 215 to enable the distinct visual recognition of the pattern and to enhance brilliance.

The lubricant layer 217 holds the resin layer 212 on the base sheet 211 such that the resin layer 212 can be peeled off the base sheet 212 and exercises some effect of protecting the resin layer 212 transferred to an article. The lubricant layer 217 is formed of a sufficiently transparent, abrasion-resistant, antifouling, solvent-resistant resin. Possible resins for forming the lubricant layer 217 include (meth)acrylic ester resins, vinyl chloride resins, vinyl acetate resins, urethane resins, melamine resins, polyester resins, mixtures of some of those resins, copolymers of some of those resins, and mold lubricants including waxes, silicone waxes, silicone resins and fluorocarbon resins. The lubricant layer 217 is formed by applying an ink prepared by dissolving or dispersing a mixture of the aforesaid resin and necessary additives in a solvent to the base sheet 211 in a film and drying the film by known means. The thickness of the lubricant layer 217 is in the range of about 0.5 to about 5 $\mu$m, more preferably, in the range of 2 to 3 $\mu$m.

An overprint coating may be formed between the lubricant layer 217 and the resin layer 212 to improve the adhesion between the lubricant layer 217 and the resin layer 212 and to enhance the durability of the resin layer.

FIGS. 26(a), 26(b) and 26(c) show examples of diffraction gratings or holographic patterns of ridge-furrow structures 213. The ridge-furrow structures 213 have ridges and furrows extending at different angles to the scanning direction of the magnetic head 8 (FIG. 2) or the length of the information recording medium transfer foil 210, respectively, and the ridge-furrow structures 113 are arranged in different combinations, respectively, to provide ferromagnetic thin films formed thereon with different magnetic characteristics, respectively.

The diffraction grating or the holographic pattern shown in FIG. 26(a) is formed by alternately arranging the ridge-furrow structures 213 and smooth sections 213n alternately along the length of the information recording medium transfer foil 210. When parts of the ferromagnetic thin film 115 corresponding to the smooth (blank) sections 213n and parts of the ferromagnetic thin film 215 corresponding to the ridge-furrow structures 113 provide signals "0" and "1", respectively, the ferromagnetic thin film 215 provides a series of signals 0, 1, 0, 1 . . .

The diffraction grating or the holographic pattern shown in FIG. 26(b) is formed by alternately arranging a combination of a first ridge-furrow structure 213 having ridges and furrows extending in parallel to the length of the information recording medium transfer foil 210 and a second ridge-furrow structure 213 having ridges and furrows extending perpendicularly to the length of the information recording medium transfer foil 210, and a smooth sections 213n not provided with any ridge-furrow structure along the length of the information recording medium transfer foil 210. When parts of the ferromagnetic thin film 215 corresponding to the smooth sections 213n, parts of the ferromagnetic thin film 215 corresponding to the first ridge-furrow structures 213, and the parts of the ferromagnetic thin film 215 corresponding to the second ridge-furrow structures 213 provide signals "0", "1" and "2", the ferromagnetic thin film 215 provides a series of signals 0, 1, 2, 0, 1, 2, . . .

The diffraction grating or the holographic pattern shown in FIG. 26(c) is formed by alternately arranging a combination of a first ridge-furrow structure 213 having ridges and furrows extending in parallel to the length of the information recording medium transfer foil 210, a second ridge-furrow structure 213 having ridges and furrows extending perpendicularly to the length of the information recording medium transfer foil 210 and a third ridge-furrow structure 213 having ridges and furrows extending at an angle of 45° to the length of the information recording medium transfer foil 210, and a smooth (blank) sections 213n not provided with any ridge-furrow structure along the length of the information recording medium transfer foil 210. When parts of the ferromagnetic thin film 215 corresponding to the smooth sections 213n, parts of the ferromagnetic thin film 215 corresponding to the first ridge-furrow structures 213, the parts of the ferromagnetic thin film 215 corresponding to the second ridge-furrow structures 213 and parts of the ferromagnetic thin film 215 corresponding to the third ridge-furrow structures 213 provide signals "0", "1", "2" and "3", the ferromagnetic thin film 215 provides a series of signals 0, 1, 2, 3, 0, 1, 2, 3, . . .

FIG. 27 shows a holographic region 206 provided with ridge-furrow structures 213 (diffraction gratings or holographic patterns) designed to form a character and an image. The ridge-furrow structures 213 forming the character and the image form interference patterns and are different from the ridge-furrow structure 213 forming their background in the angle and pitches of ridges and furrows. Regions of shapes corresponding to the character and the image may be formed in the holographic region 206 provided with the ridge-furrow structure.

Parts of the ferromagnetic thin film 215 corresponding to the patterns of the character and the image exhibit magnetic characteristics different from that corresponding to the region around the patterns of the character and the image.

The bonding layer 218 (heat-sealable layer) bonds firmly the information recording medium transfer foil 210 to an article. The bonding layer 218 is formed of a known heat-sensitive adhesive or a pressure-sensitive adhesive. Possible heat-sensitive adhesives include acrylic resins, vinyl resins, polyester resins, urethane resins, amide resins and epoxy resins. Possible pressure-sensitive adhesives include acrylic adhesives and rubber adhesives. The thickness of the bonding layer 218 may be in the range of one to several micrometers.

Usually, when an adhesive layer is used as the bonding layer 218, a protective release paper sheet coated with an adhesive forming the bonding layer 218 is applied to the information recording medium transfer foil 210. When the protective release paper sheet is removed from the information recording medium transfer foil 210 to attach the information recording medium transfer foil 210 to an article, the bonding layer 218 is transferred to the ferromagnetic thin film 215. The bonding layer 218 is formed rarely on the ferromagnetic thin film 215.

FIG. 28 is a sectional view of assistance in explaining a method of attaching the information recording medium transfer foil 210 to an article.

When the bonding layer 218 is formed of a heat-sensitive adhesive, the information recording medium transfer foil 210 provided is attached to an article 230 by applying heat and pressure to the information recording medium transfer foil 210 with a hot roller or the like by a hot-stamping method of attaching a hot-stamping foil to an article. When the bonding layer 218 is formed of a pressure-sensitive adhesive, the release paper sheet is removed, the bonding layer 218 is applied to the article 230 and pressure is applied to the information recording medium transfer foil 210 to attach the same to the article 230. Since the base sheet 211 is separated from the lubricant layer 217, the components of the information recording medium transfer foil 210 other than the base sheet 211 are transferred to the article 230. As mentioned above, the lubricant layer 217 is transferred to the article 230 and serves as a protective layer.

EXAMPLES

Fabrication of Information Recording Medium Transfer Foil

A 25 μm thick smooth, transparent polyethylene terephthalate film (LUMILAR 25T60 commercially available from Toray corp.) was used as a base sheet 211. The lubricant layer 217 was formed by applying a liquid prepared by diluting a methyl acrylate resin with toluene to the base sheet 211 by a gravure coating method.

A 3 μm thick thermoformable resin layer 212 was formed of an ultraviolet-curable resin that is a solid at ordinary temperatures on the lubricant layer 217. An embossing plate having a surface provided with a ridge-furrow pattern for forming the ridge-furrow structures 213, i.e., diffraction gratings or a holographic patterns, was pressed against the resin layer 212 to form the ridge-furrow structures 213 in the surface of the resin layer 112, and then the resin layer 212 was irradiated through the transparent base sheet 211 with ultraviolet rays for curing. Thus, ridge-furrow structures 213 forming diffraction gratings or holographic patterns as shown in FIG. 26(b) were formed on the resin layer 212. The ridge-furrow structures 113 were formed on the resin layer 212 so that sets each of a sequential arrangement of the ridge-furrow structure 213 having ridges and furrows extending in parallel to the length of the information recording medium transfer foil 210, the ridge-furrow structure 213 having ridges and furrows extending in a direction perpendicular to the length of the information recording medium transfer foil 210 and a smooth part not provided with any ridge-furrow structure are arranged successively. The pitches of the ridges of the ridge-furrow structures 213 were 0.6 μm and the depth of the furrows of the same was 0.4 μm.

Subsequently, a 300 angstrom thick reflecting layer 214 of aluminum was deposited on the surface of the resin layer provided with the ridge-furrow structures 213 by a vacuum deposition process, and a 0.2 μm thick ferromagnetic thin film 215 of an Fe—Si alloy was formed on the reflecting layer 214 by a sputtering process.

The 1 μm thick bonding layer 218 of a hot-melt adhesive of a vinyl chloride-vinyl acetate copolymer was formed on the ferromagnetic thin film 215 to complete an information recording medium transfer sheet. Then, the information recording medium transfer sheet was slit into 10 mm wide information recording medium transfer foils 210 of the present invention.

The information recording medium transfer foil 210 was attached to the article 230, i.e., a card, of a vinyl chloride resin by heating the same at 135° C. for 7 s with a hot roller, and the base sheet 211 was peeled off the lubricant layer 217 and was removed. The reflecting layer 214 of aluminum was the outermost layer of the information recording medium transfer foil 210 after the base sheet 211 had been removed and a remarkable light diffracting effect could be visually confirmed.

The magnetic characteristics of the information recording medium transfer foil 210 attached to the article 230 were measured by applying a dc magnetic field to the information recording medium transfer foil 210 by a VSM (vibrating-sample magnetometer). When a magnetic field was applied to the information recording medium transfer foil 210 in the direction of the arrow A (FIG. 25) parallel to the ridges and furrows of the ridge-furrow structure 113, the rectangularity ratio Rsq expressed by Expression (2) of the magnetic hysteresis curve of the magnetism of the ferromagnetic thin film 215 was 0.9. When a magnetic field was applied to the information recording medium transfer foil 210 in the direction of the arrow B (FIG. 26) perpendicular to the ridges and furrows of the ridge-furrow structure 213, the rectangularity ratio Rsq of the magnetic hysteresis curve of the magnetism of the ferromagnetic thin film 215 was 0.2. The same measurement can be obtained by applying an ac magnetic field to the information recording medium transfer foil 210 by a B-H analyzer.

An ac magnetic field was applied to the information recording medium transfer foil 210 in the direction of the arrow A (FIG. 25) parallel to the ridges of the ridge-furrow structure 213 and in the direction of the arrow B (FIG. 25) perpendicular to the ridges of the same and the magnetic characteristics of the ferromagnetic thin film 215 were measured by the magnetic head 8 (FIG. 2). The ratio between pulse signals provided by the magnetic head 8 when the direction of the magnetic field was parallel to the ridges of the ridge-furrow structure 213 and when the direction of the magnetic field was perpendicular to the ridges of the ridge-furrow structure 213 was about 5:1. Thus it was confirmed that information could be expressed by the ridge-furrow structures having ridges and furrows extended in different directions, respectively.

As apparent from the foregoing description, the information recording medium transfer foil (magnetic information transfer foil) of the present invention has the resin layer provided with the ridge-furrow structures (diffraction gratings or holographic patterns) and the ferromagnetic thin film formed on the resin layer with, when necessary, the reflecting layer sandwiched between the resin layer and the ferromagnetic thin film. Therefore, the information recording medium transfer foil of the present invention has a reflecting effect comparable with that of the conventional brilliant magnetic information transfer foil and exhibits brilliance specific to a diffraction grating or a holographic pattern. Combination of the brilliance and three-dimensional display effect specific to the diffraction grating or the holographic pattern, and the magnetic characteristic of the ferromagnetic thin film provides a composite effect that cannot be exercised by an ordinary brilliant magnetic information transfer foil or an ordinary magnetic information transfer foil and enhances difficulty in counterfeiting.

Forming the diffraction grating or the holographic pattern in a special pattern to complicate the magnetic characteristic of the ferromagnetic thin film can further enhance difficulty in counterfeiting and dishonest alteration.

What is claimed is:

1. An information recording medium comprising:
    a base member;
    a resin layer having a surface having a pattern region provided with a three-dimensional diffraction grating or a holographic pattern; and
    a ferromagnetic thin film formed on the resin layer;
    wherein the ferromagnetic thin film has a magnetic characteristic in accordance with the diffraction grating or the holographic pattern of the pattern region.

2. The information recording medium according to claim 1, wherein
    the surface of the resin layer has a blank region in addition to the pattern region to change a magnetic characteristic of the ferromagnetic thin film.

3. The information recording medium according to claim 1, wherein
    the pattern region is provided with two or more kinds of diffraction gratings or holographic patterns differing from each other in angular placement of ridges and furrows, and parts of the ferromagnetic thin film corresponding to the different diffraction gratings or the holographic patterns have different magnetic characteristics, respectively.

4. The information recording medium according to claim 1, wherein
    the pattern region is provided with a holographic pattern representing characters or images, and the magnetic characteristic of the ferromagnetic thin film is dependent on the holographic pattern.

5. The information recording medium according to claim 1, wherein
    the ferromagnetic thin film is formed of a soft magnetic material.

6. The information recording medium according to claim 1, wherein
    the ferromagnetic thin film is formed of a hard magnetic material.

7. The information recording medium according to claim 1, wherein
    the ferromagnetic thin film is formed of an amorphous magnetic material.

8. An information reader that reads information recorded on an information recording medium comprising a base member, a resin layer having a surface having a pattern region provided with a three-dimensional diffraction grating or a holographic pattern, and a ferromagnetic thin film formed on the resin layer and having a magnetic characteristic subject to the diffraction grating or the holographic pattern of the pattern region, said information reader comprising:
    an exciting means for ac-exciting the pattern region of the information recording medium in a predetermined direction;
    a magnetic head means for scanning the pattern region along the predetermined direction and reading a variation of magnetic flux provided by the information recording medium excited by ac-excitation; and
    a driving means for driving the information recording medium relative to the magnetic head means or the magnetic head means relative to the information recording medium to move the information recording medium or the magnetic head continuously or intermittently at a moving speed far lower than a scanning speed of the magnetic head means in a feed direction perpendicular to the scanning direction in which the magnetic head means moves relative to the information recording medium for scanning.

9. The information reader according to claim 8 further comprising:
    a display means for visibly displaying an output signal provided by the magnetic head means in synchronism with a scanning operation of the magnetic head means and a driving operation of the driving means to enable the observation of the variation of the magnetic characteristic of the ferromagnetic thin film dependent on the diffraction grating or the holographic pattern of the pattern region.

10. The information reader according to claim 8 further comprising:
    a read pattern storing means for reading output signals provided by the magnetic head means in synchronism with a scanning operation of the magnetic head means and a driving operation of the driving means and temporarily storing a read pattern corresponding to the diffraction grating or the holographic pattern formed in the pattern region;

a reference pattern storing means for storing an output signal provided by the magnetic head means and corresponding to a diffraction grating or a holographic pattern of a reference pattern region as a reference pattern; and a comparing means for comparing the read pattern read and stored in the pattern storing means and the reference pattern stored in the reference pattern storing means;

wherein the authenticity of the information recording medium is verified by the magnetic characteristic of the ferromagnetic thin film determined on the basis of the result of comparison made by the comparing means.

11. The information recording medium according to claim 1, wherein the information recording medium is embedded in a counterfeiting preventing sheet.

12. The information recording medium according to claim 11, wherein the ferromagnetic thin film is formed so as to conform to the uneven shape of the pattern region to provide the ferromagnetic thin film with a magnetic anisotropy.

13. The information recording medium according to claim 12, wherein the uneven shape of the pattern region is formed by a combination of different patterns that give parts of the ferromagnetic thin film corresponding thereto different magnetic characteristics, respectively.

14. The information recording medium according to claim 11 further comprising:

a reflecting layer formed between the resin layer and the ferromagnetic thin film.

15. The information recording medium according to claim 11, wherein an adhesive layer is formed on a surface of the base member opposite the surface on which the resin layer is formed.

16. The information recording medium according to claim 11, wherein an additional adhesive layer is formed on the ferromagnetic thin film.

17. A counterfeiting preventing sheet comprising:

an information recording medium comprising a base member, a resin layer having a pattern region provided with a three-dimensional diffraction grating or a holographic pattern, and a ferromagnetic thin film formed on the resin layer and having a magnetic characteristic in accordance with the diffraction grating or the holographic pattern of the pattern region; and a backing sheet in which the information recording medium is embedded;

wherein the backing sheet has open parts arranged at intervals to expose parts of the information recording medium therein, and covering parts extending between the open parts and covering parts of the information recording medium.

18. The counterfeiting preventing sheet according to claim 17, wherein the pattern region is provided with different patterns that give parts of the ferromagnetic thin film corresponding thereto different magnetic characteristics, respectively.

19. The counterfeiting preventing sheet according to claim 17, wherein the backing sheet is provided with plural rows each of an alternate arrangement of the open parts and the covering parts.

20. An information recording medium transfer foil comprising:

a base member;

a resin layer formed on the base member and having a pattern region provided with a three-dimensional diffraction grating or a holographic pattern;

a ferromagnetic thin film formed on the resin layer; and a heat-sealable layer or an adhesive layer formed on the ferromagnetic thin film;

wherein the ferromagnetic thin film has a magnetic characteristic in accordance with the diffraction grating or the holographic pattern of the pattern region.

21. The information recording medium transfer foil according to claim 20, wherein a lubricant layer is formed between the base member and the ferromagnetic thin film.

22. The information recording medium transfer foil according to claim 20, wherein the surface of the resin layer has a blank region in addition to the pattern region to change a magnetic characteristic of the ferromagnetic thin film.

23. The information recording medium transfer foil according to claim 20, wherein the pattern region is provided with a combination of different patterns that give parts of the ferromagnetic thin film corresponding thereto different magnetic characteristics, respectively.

24. The information recording medium transfer foil according to claim 20, wherein the pattern region is provided with a holographic pattern representing characters or images, and the magnetic characteristic of the ferromagnetic thin film is dependent on the holographic pattern.

25. The information recording medium transfer foil according to claim 20, wherein the ferromagnetic thin film is formed of an amorphous ferromagnetic material.

26. The information recording medium transfer foil according to claim 20, wherein a reflecting layer of a nonmagnetic material is formed between the resin layer and the ferromagnetic thin film.

27. An information recording medium fabricating method comprising the steps of:

fabricating an information recording medium transfer foil comprising a base member, a resin layer formed on the base member and having a pattern region provided with a three-dimensional diffraction grating or a holographic pattern, a ferromagnetic thin film formed on the resin layer and having a magnetic characteristic dependent on the diffraction grating or the holographic pattern of the pattern region, and a heat-sealable layer or an adhesive layer formed on the ferromagnetic thin film; and transferring the information recording medium transfer foil to a carrying medium.

28. The information recording medium fabricating method according to claim 27, wherein the diffraction grating or the holographic pattern of the pattern region is destroyed as the information recording medium transfer foil is transferred to the carrying medium.

* * * * *